US011956051B2

(12) United States Patent
Kalantari et al.

(10) Patent No.: US 11,956,051 B2
(45) Date of Patent: Apr. 9, 2024

(54) MULTI-BEAM TRACKING FOR EFFICIENT AND RELIABLE MMWAVE COMMUNICATION AMONG DEVICES

(71) Applicant: Telefonaktiebolaget LM Ericsson (publ), Stockholm (SE)

(72) Inventors: Ashkan Kalantari, Malmö (SE); Bipin Balakrishnan, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 30 days.

(21) Appl. No.: 17/913,192

(22) PCT Filed: Mar. 26, 2020

(86) PCT No.: PCT/EP2020/058490
§ 371 (c)(1),
(2) Date: Sep. 21, 2022

(87) PCT Pub. No.: WO2021/190750
PCT Pub. Date: Sep. 30, 2021

(65) Prior Publication Data
US 2023/0133382 A1   May 4, 2023

(51) Int. Cl.
*H04L 5/12*   (2006.01)
*H04B 7/06*   (2006.01)

(52) U.S. Cl.
CPC ......... *H04B 7/0695* (2013.01); *H04B 7/0639* (2013.01)

(58) Field of Classification Search
CPC .................. H04B 7/0695; H04B 7/0639
(Continued)

(56) References Cited

U.S. PATENT DOCUMENTS 9,472,844 B2   10/2016   Kasher
9,531,446 B2   12/2016   Sadeghi et al.
(Continued)

FOREIGN PATENT DOCUMENTS

WO   2016192070 A1   12/2016

OTHER PUBLICATIONS

Bae, et al., "New Beam Tracking Technique for Millimeter Waveband Communications," Computer Science, Feb. 2017, 6 pages.
(Continued)

*Primary Examiner* — Zewdu A Kassa
(74) *Attorney, Agent, or Firm* — Withrow & Terranova, PLLC

(57) ABSTRACT

Systems and methods are disclosed herein for tracking multiple beams between a first radio node and one or more other radio nodes. In this regard, embodiments of a method performed by a first radio node for mitigating interference between two or more three-dimensional (3D) beams between the first radio node and the one or more other radio nodes are provided. According to one embodiment, the method comprises determining that a particular 3D beam from among two or more 3D beams results in interference to at least one other 3D beam from among the two or more 3D beams, wherein both the particular 3D beam and the at least one other 3D beam are both operated on a first frequency. The method further comprises selecting a new frequency to which to switch the particular 3D beam, and switching the particular 3D beam from the first frequency to the new frequency.

12 Claims, 15 Drawing Sheets

(58) Field of Classification Search
USPC .............. 375/262, 260, 259, 219, 295, 316
See application file for complete search history.

(56) References Cited

U.S. PATENT DOCUMENTS

| | | | |
|---|---|---|---|
| 9,629,171 | B2 | 4/2017 | Roy et al. |
| 10,148,331 | B2 | 12/2018 | Yu et al. |
| 2009/0017854 | A1 | 1/2009 | Arimitsu |
| 2015/0230263 | A1* | 8/2015 | Roy ............... H04W 72/51 |
| | | | 455/452.2 |
| 2016/0192070 | A1 | 6/2016 | Bjoern-Josefsen et al. |
| 2017/0324463 | A1 | 11/2017 | Jalali |
| 2018/0242168 | A1 | 8/2018 | Matsukawa |
| 2018/0358694 | A1 | 12/2018 | Shimizu |

OTHER PUBLICATIONS

Hassanieh, et al., "Fast Millimeter Wave Beam Alignment," SIGCOMM, Aug. 20-25, 2018, Budapest, Hungary, Association for Computing Machinery, 14 pages.

Kim, et al., "Beam-Tracking Technique for Millimeter-Wave Cellular Systems Using Subarray Structures," IEEE Transactions on Vehicular Technology, vol. 67, Issue 8, Aug. 2018, pp. 7806-7810.

Li, et al., "Analog Beam Tracking in Linear Antenna Arrays: Convergence, Optimality, and Performance," Asilomar Conference on Signals, Systems, and Commputers, Oct. 2017, Pacific Grove, California, IEEE, pp. 1193-1198.

Maschietti, et al., "Robust Location-Aided Beam Alignment in Millimeter Wave Massive MIMO", IEEE Global Communications Conference, Dec. 4-8, 2017, Singapore, 6 pages.

Rangan, et al., "Millimeter-Wave Cellular Wireless Networks: Potentials and Challenges," Proceedings of the IEEE, vol. 102, Issue 3, Mar. 2014, pp. 366-385.

Xue, et al., "Beamspace SU-MIMO for Future Millimeter Wave Wireless Communications," IEEE Journal on Selected Areas in Communications, vol. 35, Issue 7, Jul. 2017, pp. 1564-1575.

Xue, et al., "Beam Management for Millimeter-Wave Beamspace MU-MIMO Systems," IEEE Transactions on Communications, vol. 67, Issue 1, Jan. 2019, pp. 205-217.

International Search Report and Written Opinion for International Patent Application No. PCT/EP2020/058490, dated Jun. 3, 2020, 12 pages.

* cited by examiner

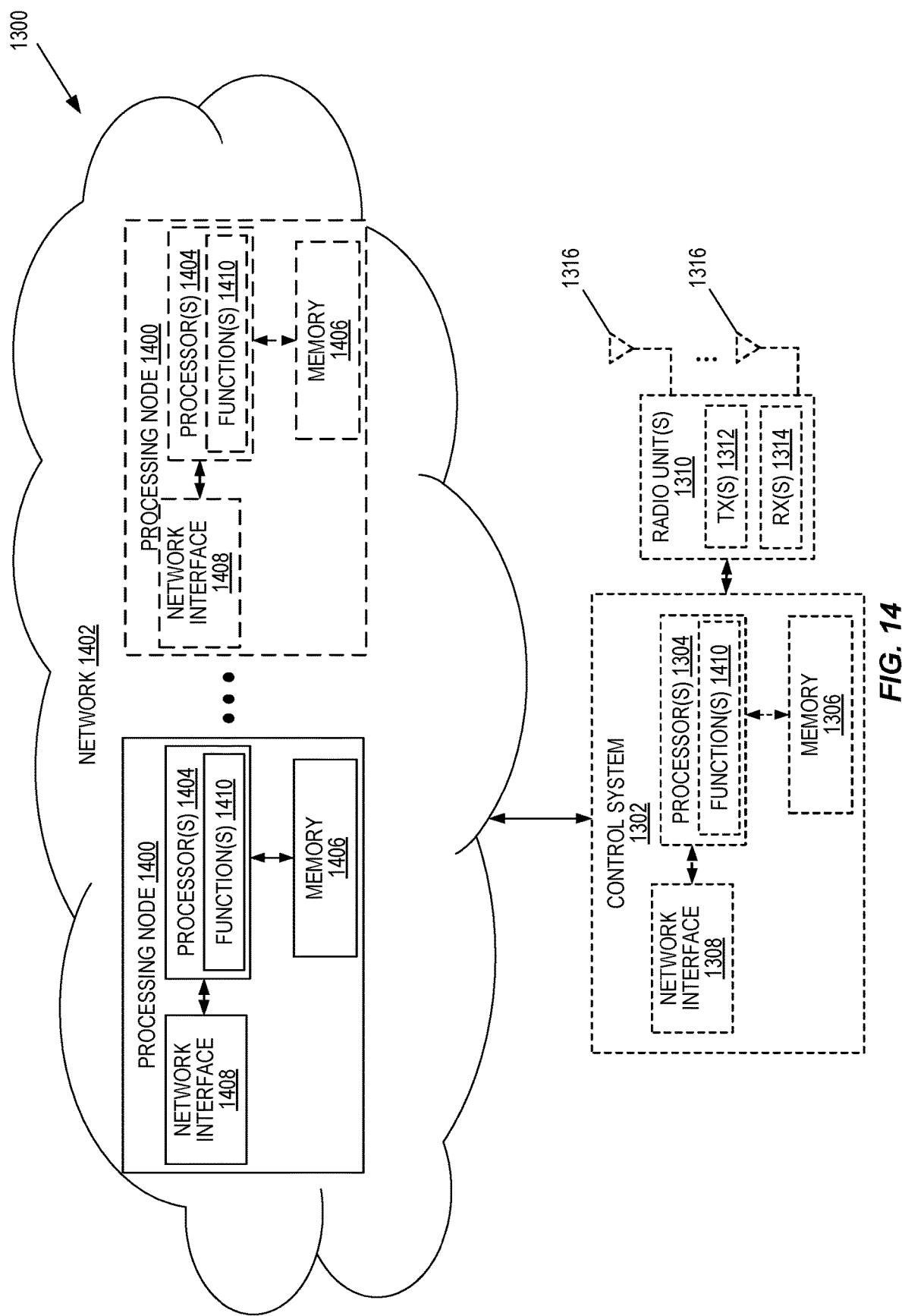

MULTI-BEAM TRACKING FOR EFFICIENT AND RELIABLE MMWAVE COMMUNICATION AMONG DEVICES

This application is a 35 U.S.C. § 371 national phase filing of International Application No. PCT/EP2020/058490, filed Mar. 26, 2020, the disclosure of which is incorporated herein by reference in its entirety.

TECHNICAL FIELD

The disclosed subject matter relates generally to telecommunications, and more specifically to tracking multiple beam connections to a set of radio nodes to determine a frequency based on signal interference with at least one other beam from among the multiple beams.

BACKGROUND

In the fifth generation of mobile technology (5G), more than 90% of the associated radio frequency (RF) falls in the millimeter wave range (mmWave), which can provide a Giga bit-per-second data rate. As such, it is important to develop techniques in order to use the frequency spectrum efficiently. However, in contrast to lower frequencies on the frequency spectrum, communication in mmWave frequencies can be easily blocked by barriers, e.g., objects, humans, etc. On the other hand, the use of higher frequencies allows for the manufacturing of smaller antenna arrays. Accordingly, these antenna arrays can be configured to be used to create three-dimensional (3D) pencil beams to concentrate the transmission energy in a specific direction.

Energy concentration via the use of 3D pencil beams comes with the advantages of larger transmission distances and the ability to maneuver around blockages by switching or tilting the beams. Nevertheless, the use of energy concentration techniques comes with a downside that the beams need to be adjusted continuously in order for the associated transmissions to be received with a reasonable Signal to Interference plus Noise Ratio (SINR). Algorithms for beam selection have been developed in Institute of Electrical and Electronics Engineers (IEEE) 802.15.c, 802.11.ad, and 802.11.ay standards. In addition, Q. Xue, X. Fang and C. Wang, "Beamspace SU-MIMO for Future Millimeter Wave Wireless Communications," *IEEE Journal on Selected Areas in Communications*, vol. 35, no. 7, pp. 1564-1575, 2017 (referred to herein as the "first Xue paper") and Q. Xue, X. Fang, M. Xiao, S. Mumtaz and J. Rodriguez, "Beam Management for Millimeter-Wave Beamspace MU-MIMO Systems," *IEEE Transactions on Communications*, vol. 67, no. 1, pp. 205-217, 2019 (referred to herein as the "second Xue paper") describe beam selection algorithms developed for single-user and multi-user mmWave Multiple Input Multiple Output (MIMO) communications, where these beam selection algorithms are based on hierarchical beam scanning, i.e., starting with lower resolution beams and moving to higher resolution beams. The mentioned solutions use large beams in the initial scanning phase, which may get multiple strong destructive signals that cancel each other. This would not happen if the beams were narrower. As a remedy, the authors in H. Hassanieh, O. Abari, M. Rodriguez, M. Abdelghany, D. Katabi and P. Indyk, "Fast Millimeter Wave Beam Alignment," in *Special Interest Group on Data Communication (SIGCOMM)*, Budapest, Hungary, 2018 (referred to herein as the "Hassanieh paper") developed a beam scanning method that uses multi-arm beams which can decrease the chance of two or more strong signals colliding in the same beam.

The first Xue paper, the second Xue paper, and the Hassanieh paper consider beam training. When the devices are moving, the beams need to be tracked to keep a connection. In U.S. Pat. No. 9,629,171 B2 (hereinafter "the '171 patent"), a mmWave base station (BS) uses localization and position prediction methods to select a beam to cover a moving cellular wireless device and improve a handover when communicating with the device. In this way, the mmWave BS does not require beam acquisition or the use of previous beam allocation history.

In another paradigm, the mmWave BS tracks at least one beam by sending multiple downlink and uplink reference signals, as proposed in U.S. Pat. No. 10,148,331 B2 (hereinafter "the '331 patent"). In another paradigm, C. Yeong, J. Kim and Y. Soo, "Beam-Tracking Technique for Millimeter-Wave Cellular Systems Using Subarray Structures," *IEEE Transactions on Vehicular Technology*, vol. 67, no. 8, pp. 7806-7810, 2018 (hereinafter "the Yeong patent") uses angle-of-arrival (AoA) and angle-of-departure (AoD) techniques to track the beam between the mmWave BS and device in a cellular mmWave setup. Similarly, J. Bae, S. H. Lim, J. H. Yoo and J. W. Choi, "New Beam Tracking Technique for Millimeter Wave-band Communications," 2017 (hereinafter "the Bae paper") uses the change in the AoA and a probabilistic change of AoA to select the best beam pair from a codebook when user equipment (UE) is moving.

J. Li, Y. Sunx, L. Xiao, S. Zhou and C. E. Koksal, "Analog Beam Tracking in Linear Antenna Arrays: Convergence, Optimality, and Performance," in *Asilomar Conference on Signals, Systems, and Computers (ACSSC)*, 2017 (hereinafter "the Sunx paper") proposes a fast and recursive beam tracking algorithm, which uses only five pilot symbols per second to track the beam at a received device which is equipped with an antenna array. To include in deterministic situations, F. Maschietti, D. Gesbert, P. d. Kerret and H. Wymeersch, "Robust Location-Aided Beam Alignment in Millimeter Wave Massive MIMO," in *IEEE Global Communications Conference*, Singapore, 2017 (hereinafter "the Maschietti paper) uses a Bayesian approach is used to select the beam pair between the mmWave BS and device while exploiting statistical movement information of the devices as well as potential reflector location.

In another approach, U.S. Pat. No. 9,472,844 B2 (hereinafter "the '844 patent") uses a camera of the device, where image(s) are captured by a mobile device to track the movement and change of the device itself. Accordingly, this information is used to change an orientation or directivity of the antenna array of the device itself or to perform beam training so that a wireless link improves. Certain challenges exist for the existing solutions. In the '171 patent, the positioning of a wireless device is determined, the mmWave BS uses the location information of a wireless device to select only one modified beam for a more efficient handover. The '844 patent uses a camera of the wireless device to update only one wireless link between two devices, multiple images are required to be processed in order to establish the location information. This approach requires the memory of the device to store the images. Subsequently, the energy consumption can be substantially higher if the external memory of the device is used to store the image. Due to this approach, in relying on the images to understand the orientation of the devices, the device would either be moving or static in order to process the images. The movement trajectory prediction is not considered in updating the beamforming. The movement trajectory prediction helps with processing to provide a faster and more advanced beam update during the movement of one or more of the devices. U.S. Pat. No. 9,531,446 B2 (hereinafter "the '446 patent") uses the location of one or two mobile devices to accelerate, e.g., skipping a sector scan, the training process in the conventional two-dimensional (2D) beam training process, such as IEEE 802.11.ac, for establishing or maintaining a mmWave link. This approach reduces the beam training time; however, it does not scale up efficiently when the number of mmWave links increases. In addition, beam training is the only solution used to improve link quality.

As such, none of the mentioned works above propose a solution for multiple moving devices, wherein each device has a 2D planar antenna array for beam forming and needs to sustain multiple link connections using frequency multiplexing among the beams.

SUMMARY

Systems and methods are disclosed herein for tracking multiple beams between a first radio node and one or more other radio nodes. In this regard, embodiments of a method performed by a first radio node for mitigating interference between two or more three-dimensional (3D) beams between the first radio node and the one or more other radio nodes are provided. According to one embodiment, the method performed by the first radio node comprises determining that a particular 3D beam from among two or more 3D beams results in interference to at least one other 3D beam from among the two or more 3D beams, wherein both the particular 3D beam and the at least one other 3D beam are both operated on a first frequency. The method further comprises selecting a new frequency to which to switch the particular 3D beam, the new frequency being different than the first frequency. The method further comprises switching the particular 3D beam from the first frequency to the new frequency.

In some embodiments, prior to determining that the particular 3D beam results in interference to the at least one other 3D beam, the method further comprises determining the two or more 3D beams between the first radio node and the one or more other radio nodes, wherein there is at least one beam between the first radio node and each of the one or more other radio nodes. The method further comprises determining that there is a change in position and/or orientation of the first radio node and/or a change in position and/or orientation of a second radio node, the second radio node being one of the one or more other radio nodes. The method also comprises adjusting a 3D beam between the first radio node and the second radio node based on the change in position and/or orientation of the first radio node and/or the change in position and/or orientation of the second radio node, the adjusted 3D beam being one of the two or more 3D beams that is between the first radio node and the second radio node. In some examples the particular 3D beam is the adjusted 3D beam.

In some embodiments, the method can further comprises obtaining location and/or orientation information for the first radio node and at least the second radio node. In some embodiments, the first radio node is capable of transmitting 3D beams on a set of frequencies comprising the first frequency and the new frequency, and selecting the new frequency to switch the particular 3D beam comprises determining that there is an unused frequency in the set of frequencies. Additionally, transmitting 3D beams on the set of frequencies also comprises selecting the unused frequency as the new frequency to switch the particular 3D beam.

In some embodiments, the first radio node is capable of transmitting the 3D beams on the set of frequencies comprising the first frequency and the new frequency. Accordingly, selecting the new frequency to switch the particular 3D beam comprises ranking each frequency in the set of frequencies based on one or more criteria. The criterion comprises an amount of interference caused to one or more 3D beams operating on the frequency if the particular 3D beam is switched to the frequency. The criterion comprises the amount of interference caused to the one or more 3D beams operating on the frequency that are used for ultra-reliable low-latency communication, if the particular 3D beam is switched to the frequency. The criterion comprises the amount of interference caused to the one or more 3D beams operating on the frequency that are used for communication other than ultra-reliable low-latency communication (URLLC), if the particular 3D beam is switched to the frequency.

In some embodiments, the two or more 3D beams comprise a first set of beams operated on the first frequency, a second set of beams operated on a second frequency, and at least one additional set of beams operated on at least one additional frequency, respectively. Additionally, the method comprises selecting the new frequency to which to switch the particular 3D beam comprises selecting the new frequency to which to switch the particular 3D beam from among a set of frequencies consisting of the second frequency and the at least one additional frequency based on one or more geometric parameters related to the particular 3D beam and others of the two or more 3D beams in the second set of beams and the at least one additional set of beams.

In some embodiments, the spatial distance between two 3D beams is a shortest 3D line that: (1) connects two lines representing Line-of-Sight (LOS) lines of the two 3D beams and (2) is orthogonal to both of the two lines representing LOS lines of the two 3D beams. Additionally, a spatial angle between the two 3D beams is an angle between the two lines representing LOS lines of the two 3D beams.

In some embodiments, the at least one additional frequency based on the one or more geometric parameters comprises determining one of the set of frequencies on which the particular 3D beam would cause a least amount of interference to those of the two or more 3D beams operated on that frequency based on the one or more geometric parameters related to the particular 3D beam and others of the two or more 3D beams in the second set of beams and the at least one additional set of beams. In addition, the one or more geometric parameters comprise selecting a determined one of the set of frequencies as the new frequency.

In some embodiments, the method further comprises performing a frequency switch for at least one affected beam from among the two or more 3D beams, the at least one affected beam comprising at least one beam from among the two or more beams that is affected by switching the particular 3D beam from the first frequency to the new frequency.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 14 is a schematic block diagram that illustrates a virtualized embodiment of the radio access node of FIG. 13 according to some embodiments of the present disclosure;

DETAILED DESCRIPTION

Figure 1:
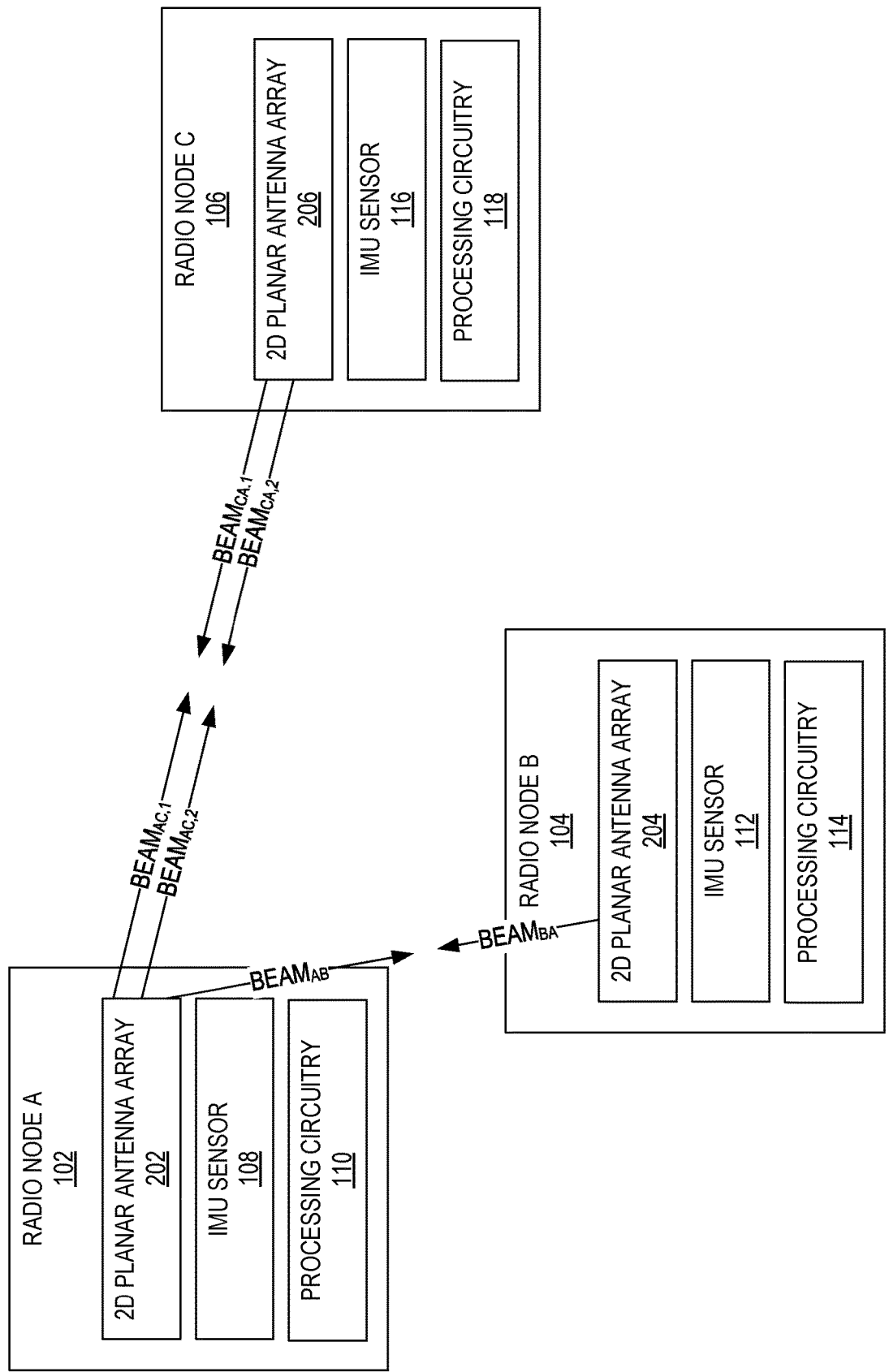
FIG. 1 illustrates one example of a wireless system 100 that provides beam tracking for multiple beams between multiple radio nodes in accordance with one embodiment of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a "radio access node" or a "wireless communication device".

Radio Access Node: As used herein, a "radio access node" or "radio network node" or "radio access network node" is any node in a Radio Access Network (RAN) of a cellular communications network that operates to wirelessly transmit and/or receive signals. Some examples of the radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU) or a network node that implements part of the functionality of some other type of radio access node.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Systems and methods are disclosed herein for efficiently tracking multiple beam connections among multiple radio nodes (e.g., among multiple wireless communication devices or between a radio access node and one or more wireless communication devices) in a LOS communication channel. This LOS channel is preferably, but not necessarily, a millimeter wave (mmWave) communication channel. The multiple beam connections among the radio nodes can be used to increase data rates, via multiplexing, or to increase reliability by transmitting multiple copies of the same data stream. In some embodiments, frequency multiplexing across a two-dimensional (2D) planar antenna array is further provided to enable more beam connections while keeping Signal to Interference plus Noise Ratio (SINR) at the required level.

According to some embodiments, the radio nodes exchange their movement information with each other. This information can be used to adjust (e.g., tilt) three-dimensional (3D) pencil beams used for transmission and reception between the radio nodes such that beam pairs stay connected between the radio nodes. Adjusting the beams can cause interference and reduce the SINR. As such, in some embodiments, a frequency switching procedure based on spatial 3D geometry is configured to switch the frequency of the beams such that the interference is reduced and the SINR improves.

In this regard, FIG. 1 illustrates one example of a wireless system 100 that provides beam tracking for multiple beams between multiple radio nodes in accordance with one embodiment of the present disclosure. As illustrated, the wireless system 100 includes radio nodes 102, 104, and 106. While there are three radio nodes 102, 104, and 106 in this example, the wireless system 100 may include any number of two or more radio nodes. The radio nodes 102, 104, and 106 may be wireless communications devices (e.g., UEs performing Device-to-Device (D2D) communication in a cellular communications system such as, e.g., the 5G system), radio access nodes (e.g., base stations in a cellular communications system), or a mixture thereof.

As illustrated, the radio node 102 includes a 2D planar antenna array 202, an example of which will be described in more detail below in regarding to FIG. 2. The 2D planar antenna array 202 is capable of creating 3D pencil beams directed towards, in this example, the other radio nodes 104 and 106. The 2D planar antenna array 202 includes multiple antenna elements arranged in a 2D planar array. The antenna elements are divided into multiple groups, where each group of antenna elements is used by the radio node 102 to create a 3D pencil beam in a particular location. Thus, if there are, for example, four groups of antenna elements in the 2D planar antenna array 202, these four groups of antenna elements can be used to create four respective 3D beams. The number of antenna elements in each group depends on the desired sharpness of the 3D beams. The location of each group of antenna elements within the 2D planar array used to create each 3D beam depends on the direction of the desired 3D beam. For example, 3D beams having similar directions may be created using similarly located groups of antenna elements so those 3D beams will cause less interference to one another. The phase and amplitude of each antenna element of the 2D planar antenna array 202 can be tuned independently such that each group of the antenna elements can create its own beam and steer it towards the desired direction. The directivity (sharpness) of each beam can be tuned. The antenna current can be tuned to increase the power of the 3D beams.

The radio node 102 also includes an Inertial Measurement Unit (IMU) sensor 108 that operates to measure linear velocity, angular rate, and linear acceleration of the radio node 102 using one or more accelerometers and rotational rate using one or more gyroscopes. A magnetometer is utilized as a heading reference. Thus, in one example, the IMU sensor 108 includes an accelerometer, a gyro, and a magnetometer per axis (x,y,z).

Lastly, the radio node 102 includes processing circuitry 110 that operates to cause the radio node 102 to provide the functionality of the radio node 102 described herein. The processing circuitry 110 includes one or more processors (e.g., one or more Central Processing Units (CPUs), one or more Application Specification Integrated Circuits (ASICs), one or more Field Programmable Gate Arrays (FPGAs), or the like, or any combination thereof).

In a similar manner, the radio node 104 includes a 2D planar antenna array 204, an IMU sensor 112, and processing circuitry 114. Likewise, the radio node 106 includes a 2D planar antenna array 206, an IMU sensor 116, and processing circuitry 118. The radio nodes 102, 104, and 106 communicate with one another via multiple 3D beams. In this example, the radio nodes 102 and 104 communicate via a beam pair {$BEAM_{AB}$, $BEAM_{BA}$}, and the radio nodes 102 and 106 communicate via beam pair {$BEAM_{AC,1}$, $BEAM_{CA,1}$} and beam pair {$BEAM_{AC,2}$, $BEAM_{CA,2}$}.

The availability of a strong LOS communication link between each pair of the radio nodes 102, 104, and 106 is assumed, during the beam establishment and tracking phases. Accordingly, embodiments of the solutions described herein can be utilized where the radio nodes 102, 104, and 106 have LOS communication links in various combinations of situations. Additionally, conventional beam training procedures can be used for each radio node 102, 104, and 106 to point a desired number of 3D transmit beams toward one or more 3D receive beams of the target radio node. As such, the radio nodes 102, 104, and 106 can be configured to establish one or more desired 3D beam connections using any desired beam training procedure, such as, e.g., one of the conventional beam training procedures. Each of the 3D beams can be adjusted (e.g., tilted in 3D space) by adjusting the phase and amplitude of the antenna elements which create the 3D beam, denoted as the "related group" of antenna elements. The number of beam connections between a pair of radio nodes depends on the desired data rate or reliability.

Figure 2:
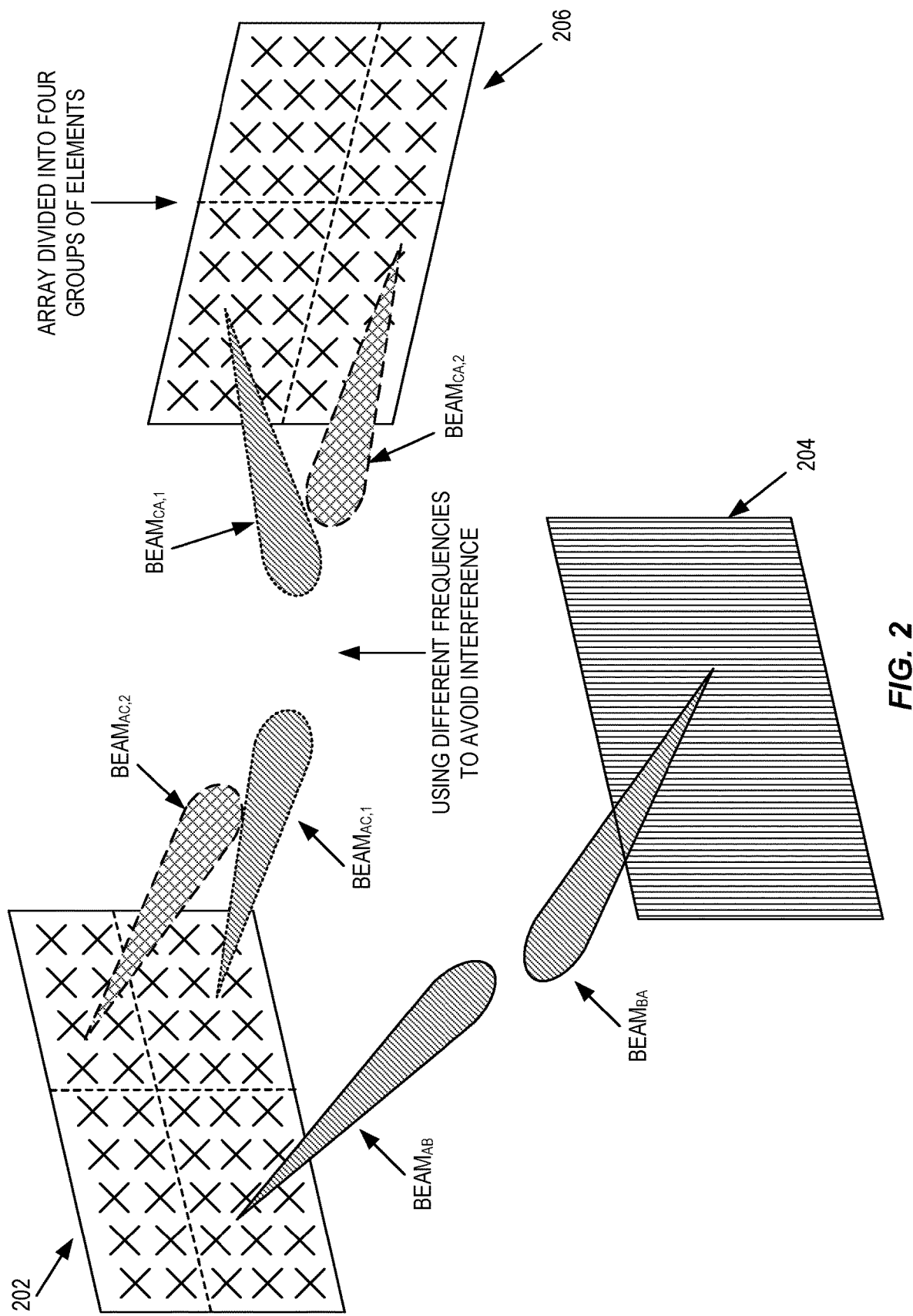
FIG. 2 illustrates one example of a device to device communication, where one device communicates with two other devices via multiple beams.

FIG. 2 illustrates the 2D planar arrays 202, 204, and 206 of the radio nodes 102, 104, and 106 in more detail. As can be seen in FIG. 2, in this example, the 2D antenna arrays 202, 204, and 206 of the respective radio nodes 102, 104, and 106 are each divided into different groups, or subarrays, of antenna elements, which are used to create multiple beams. Again, in this example, the radio nodes 102 and 104 use their respective 2D planar antenna arrays 202 and 204 to create the beam pair {$BEAM_{AB}$, $BEAM_{BA}$}, and the radio nodes 102 and 106 use their respective 2D planar antenna arrays 202 and 206 to create the beam pair {$BEAM_{AC,1}$, $BEAM_{CA,1}$} and beam pair {$BEAM_{AC,2}$, $BEAM_{CA,2}$}. Accordingly, each of the radio nodes 102, 104, 106 are configured to transmit a beam that is configured to pair or connect with one or more additional beams of a different radio node. Notably, the 3D beams can use the same or different frequencies, as will be discussed below in detail.

Each pair of 3D beams is initially selected such that they will not spatially interfere with other pairs of 3D beam pairs. The 3D beam pairs include a first beam on a first subarray, and a second beam on a second subarray, that are assigned to the same frequency. In some examples, there can be one or more 3D pairs of beams that are assigned to different frequencies. At this stage, the 3D beam pairs can also be paired based on one or more application requirements. For example, applications with more stringent latency requirements and/or reliability requirements can be assigned beams pairs with unique frequencies. The unique frequencies can be assigned such that their probability of interference is reduced and thereby minimizing the chance of beam re-allocation leading to a gap in data transmission. However, depending on the movement or orientation of each of the radio nodes 102, 104, and 106, each of the 3D beams of the radio node 102 can be tilted or adjusted in order to maintain the paired connection with the corresponding radio node. During the beam adjustment, the communication links of each of the 3D beams may interfere with each other, as is shown with the beam pair {BEAM$_{AC,2}$, BEAM$_{CA,2}$} in FIG. 2 which interferes with the beam pair {BEAM$_{AC,1}$, BEAM$_{CA,2}$}. Upon interference between one or more beam pairs, depending on the spectrum availability, different frequencies can be used to reduce the interference, as shown in FIG. 2 and described below in detail.

Accordingly, after the initial beam establishment, once the radio nodes 102, 104, and 106 start moving and it is desired to sustain the beam connections, the radio nodes 102, 104, and 106 obtain information about their movement (referred to herein as "movement information") from the their respective IMU sensors 108, 112, and 116, optionally exchange this movement information with each other, and use this movement information to adjust their 3D beams in order to reestablish or maintain their connections with each other. Once movement has been detected, beam tracking can be determined through a calculation of the position and orientation of the radio nodes 102, 104, and 106. Beam tracking can further be determined by predicting the future position and orientation of the radio nodes 102, 104, and 106, e.g., if the instantaneous movement information of one or more of the devices is not available soon enough to maintain the connection.

In some embodiments, when the radio nodes 102, 104, and 106 are within a warehouse, factory, or similar environment, the radio nodes 102, 104, and 106 may have repetitive schedules, which can be used for beam tracking since the future position of one or more of the devices is deterministic.

In one embodiment, the information about the movement of the radio nodes 102, 104, and 106, such as, e.g., the IMU sensor output, or predicted position, trajectory and orientation values, is appended to information packets transmitted among the radio nodes 102, 104, and 106.

In one embodiment, in order to increase the reliability margin, the radio nodes 102, 104, and 106 use predicted trajectory information to reserve communication resources such as frequency bands and 3D beams. In specific scenarios where the location on potential static blockages (e.g., walls or columns) is known, e.g., factory environment, this information can be used along with the information about the position and orientation of the radio nodes 102, 104, and 106 to adjust the 3D beams or switch the 3D beams to different groups of antenna elements in order to minimize the link blockage duration. This is useful when the barrier does not block all antenna beams at the same time; hence, the connection could be transferred to other beams as soon as they get blocked.

Based on the communicated movement information (e.g., speed, acceleration, orientation), the radio nodes 102, 104, and 106 can adjust the phase of each group of elements of the planar array in order to adjust (e.g., tilt) the related 3D beams so that the connection for each 3D beam pair is sustained, as shown in FIG. 2 where the groups are divided using dashed lines. As such, the beam adjustment compensates for the translation and rotation of the radio nodes 102, 104, and 106 along the x-axis, y-axis, or z-axis direction. In one example, if the adjustment of one or more of the 3D beams cause inter-beam interference and reduces the signal to interference noise ratio (SINR) below a desired threshold level, the beam frequency is switched to improve the SINRs.

In one embodiment, if the forward communication link encounters an error rate above a (e.g., programmable) threshold and for a (e.g., programmable) sustained period, then a request to switch beam pairs is sent back to transmitting radio node, e.g. via the reverse path indirectly via another radio node (e.g., a base station). For links that do not need high reliability, only one of these feedback paths can be used. A frequency switching procedure is discussed below. This frequency switching procedure can be used by the radio nodes 102, 104, and 106 to switch the frequency of the 3D beam pair to avoid or mitigate inter-beam interference.

Figure 3:
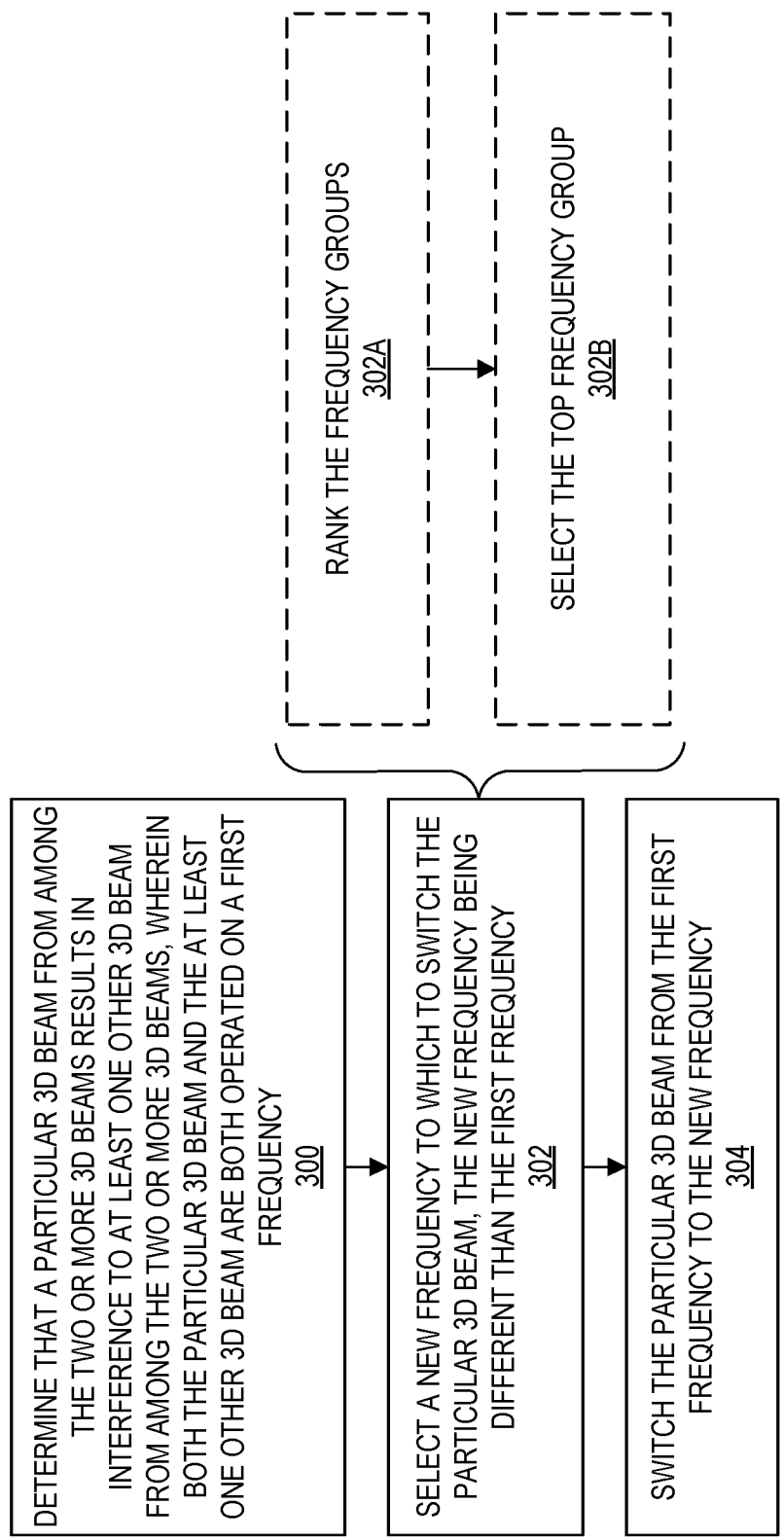
FIG. 3 is a flowchart illustrating a method implemented in a communication system, in accordance with one embodiment of the present disclosure.

In this regard, FIG. 3 is a flowchart illustrating the operation of a radio node to mitigate inter-beam interference in accordance with one embodiment of the present disclosure. Optional steps are represented by dashed lines/boxes. In this example, the radio node is the radio node 102 of FIG. 1. As illustrated, the radio node 102 determines that a particular 3D beam from among two or more 3D beams between the radio node 102 and one or more other radio nodes (e.g., the radio nodes 104 and 106) results in interference to (i.e., an unacceptable amount of interference to) at least one other 3D beam from among the two or more 3D beams (step 300). The unacceptable amount of interference is an amount of interference that is greater than a predefined or preconfigured threshold amount of interference. Looking at the example of FIG. 4, the radio node 102 determines that BEAM$_{AC,1}$ cause interference to BEAM$_{AC,2}$ (or equivalently that the beam pair {BEAM$_{AC,1}$, BEAM$_{CA,1}$} causes interference to the beam pair {BEAM$_{AC,2}$, BEAM$_{CA,2}$}). Both the particular 3D beam and the at least one other 3D beam are both currently operated on a first frequency. Note that, in one embodiment, it is the Tx beam that is interfering with Rx beam(s). The radio node 102 selects a new frequency to which to switch the particular 3D beam (step 302). The new frequency is different than the first frequency. In one embodiment, in order to select the new frequency, the radio node 102 ranks one or more available frequencies (step 302A). In one embodiment, for each available frequency (not including the first frequency), the ranking is based on: (a) an amount of interference caused to one or more 3D beams operating on the frequency if the particular 3D beam is switched to the frequency, (b) an amount of interference caused to one or more 3D beams operating on the frequency that are used for URLLC, if the particular 3D beam is switched to the frequency, (c) an amount of interference caused to one or more 3D beams operating on the frequency that are used for communication other than the URLLC, if the particular 3D beam is switched to the frequency; or both (b) and (c). The radio node 102 then selects the highest ranked available frequency as the new frequency to which to switch the particular 3D beam (step 302B). The radio node 102 switches the particular 3D beam from the first frequency to the new frequency (step 304).

Figure 4:
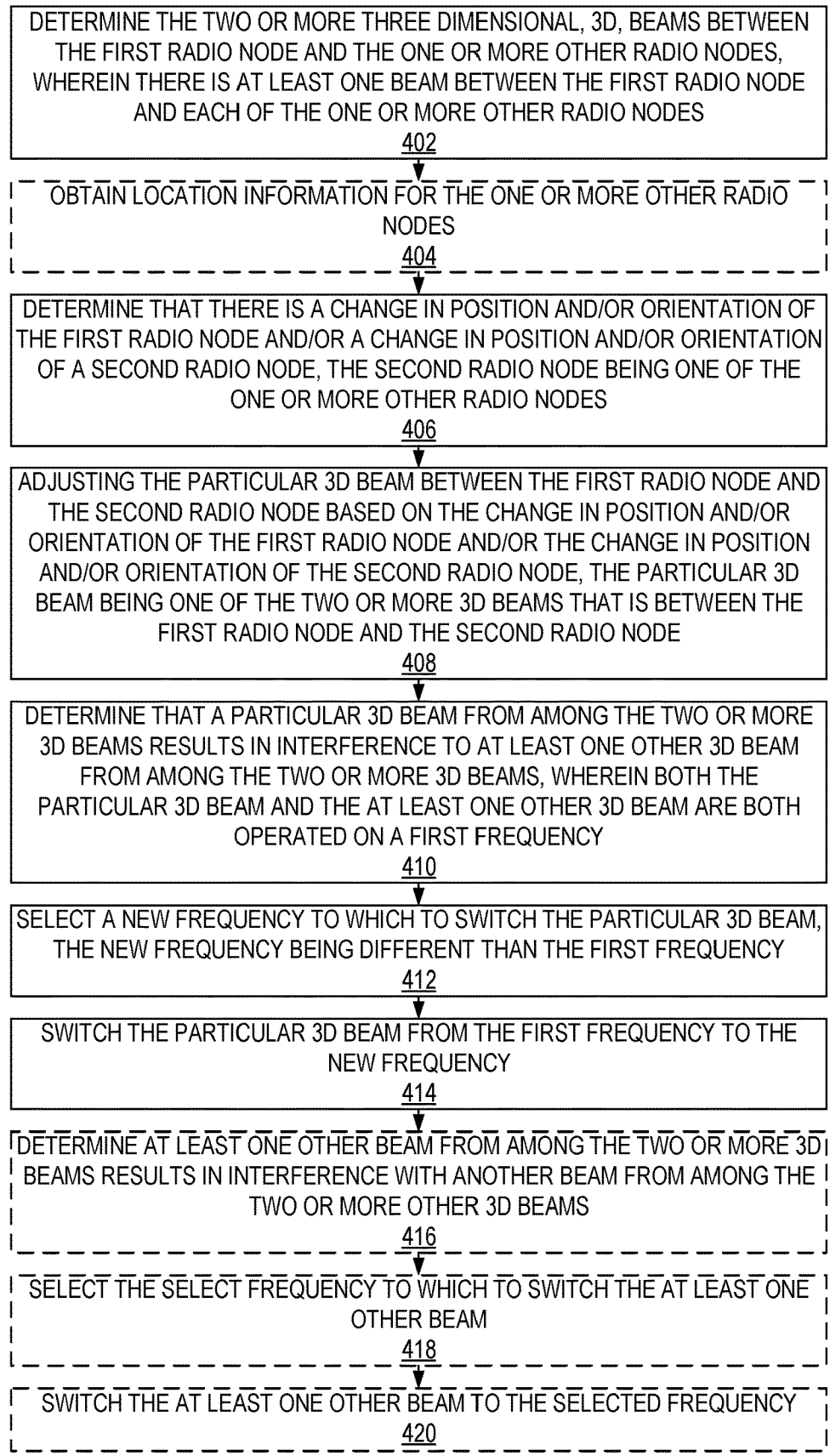
FIG. 4 is a flowchart illustrating a method implemented in a communication system in accordance with one embodiment of the present disclosure.

FIG. 4 is a flowchart illustrating the operation of a radio node to mitigate inter-beam interference in accordance with another embodiment of the present disclosure. Optional steps are represented by dashed lines/boxes. In this example, the radio node is the radio node 102 of FIG. 1 and is sometimes referred to as the "first radio node". The process of FIG. 4 can be seen as one example implementation of the process of FIG. 3. In this regard, step 410 corresponds to step 300, step 412 corresponds to step 302, and step 414 corresponds to step 304. As illustrated in FIG. 4, the radio node 102 determines two or more 3D beams between the radio node 102 and the one or more other radio nodes (e.g., radio nodes 104 and 106) (step 402). In other words, the radio node 102 establishes the beam pairs with the one or more other radio nodes 104 and 106 such that there is no inter-beam interference (or an acceptable level of inter-beam interference). There is at least one beam between the radio node 102 and each of the one or more other radio nodes 104 and 106. The radio node 102 may obtain movement information for each of the one or more other radio nodes (e.g., radio nodes 104 and 106) (step 402). As described above, the radio node 102 may receive the movement information for the one or more other radio node(s) 104 and 106. For example, the movement information may be included in packets received from the other radio node(s) via the communication link(s) established over the respective beam pair(s).

The radio node 102 determines that there is a change in position and/or orientation of the radio node 102 (e.g., based on the output of its own IMU sensor 108) and/or a change in position and/or orientation of one of the one or more other radio nodes (i.e., a second radio node), which for this example is the radio node 106 (step 406). The radio node 102 adjusts the particular 3D beam between the radio node 102 and the second radio node 206 based on the change in position and/or orientation of the radio node 102 and/or the change in position and/or orientation of the second radio node 106 (step 408). Here, the particular 3D beam being adjusted is the 3D beam that is between the radio node 102 and the second radio node 106 (e.g., $\text{BEAM}_{AC,1}$). The radio node 102 determine that the adjusted 3D beam results in interference to at least one other 3D beam (e.g., $\text{BEAM}_{AC,2}$), wherein both the adjusted 3D beam and the at least one other 3D beam are both operated on a first frequency (step 410). For example, the radio node 102 may determine that the SINR for the at least one other 3D beam has fallen below a predefined or preconfigured threshold SINR, which indicates that there is an unacceptable level of interference caused to the other 3D beam(s). In order to mitigate this interference, the radio node 102 selects a new frequency to which to switch the adjusted 3D beam (412). The new frequency is different than the first frequency. As discussed above, in one embodiment, selection of the new frequency may include ranking the available frequencies and selecting the highest ranked frequency. The radio node 102 switches the adjusted 3D beam from the first frequency to the new frequency (step 414).

The radio node 102 may also determine at least one other (adjusted) 3D beam results in interference with another 3D beam (step 416). For instance, as a result of the movement of the radio node 102 or the one or more other radio nodes 104 and 106, other beams may also be adjusted for beam tracking and result in an unacceptable level of interference to one or more other 3D beams. In order to mitigate the inter-beam interference, the radio node 102 may also select a new frequency(s) to which to switch the at least one other 3D beam (step 418). The radio node 102 may then switch the at least one other 3D beam from to the selected new frequency for the at least one other 3D beam.

Figure 5:
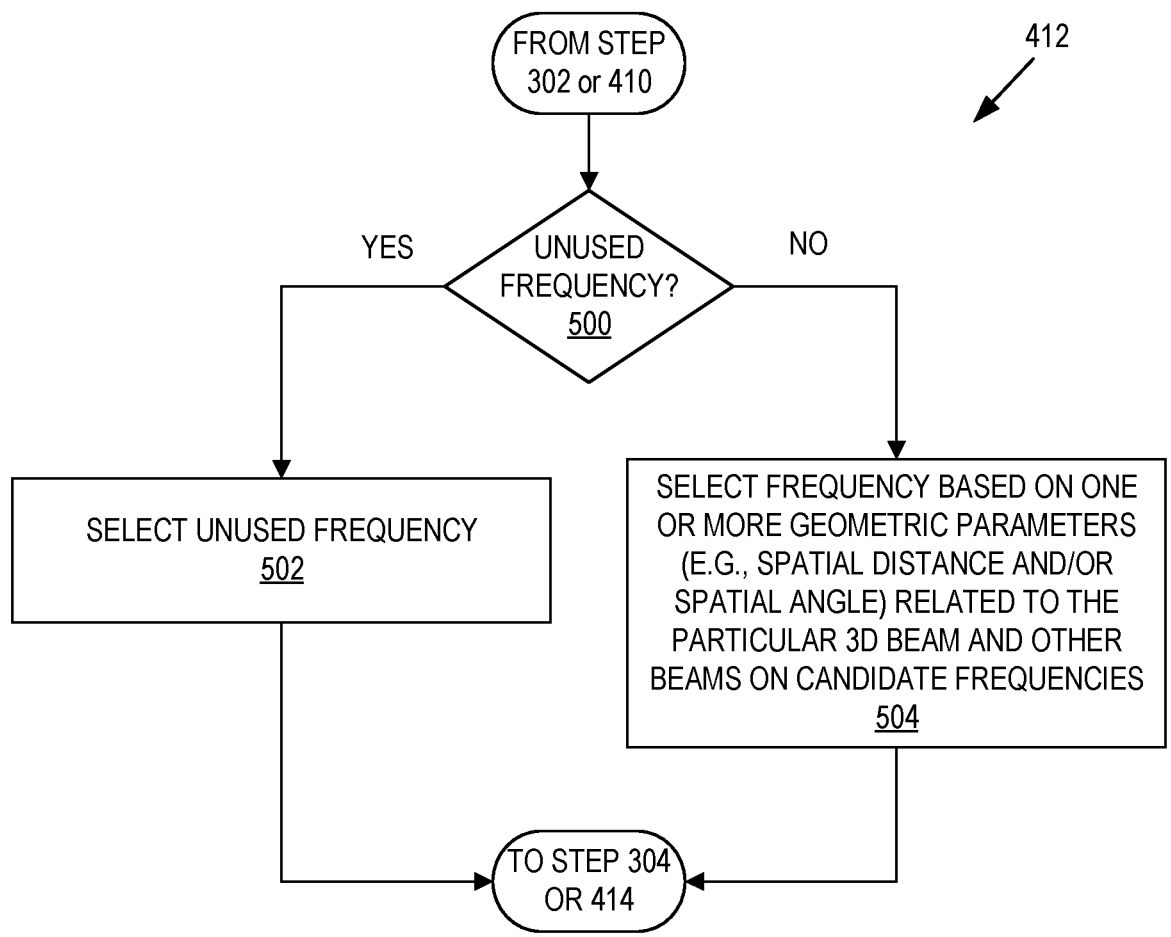
FIG. 5 is a flowchart illustrating a method implemented in a communication system in accordance with one embodiment of the present disclosure.

FIG. 5 is a flowchart illustrating a process by which the radio node 102 selects the new frequency for the particular/adjusted 3D beam in step 302/410, in accordance with another embodiment of the present disclosure. As illustrated, in selecting the new frequency to which to switch the particular/adjusted 3D beam, the radio node 102 determines whether an unused frequency is in a set of available frequencies (step 500). The set of available frequencies is a set of frequencies on which the radio node 102 is capable of transmitting the particular/adjusted 3D beam. Here, an "unused frequency" is a frequency in the set of available frequencies that is currently not being used by any of the 3D beams of the radio node 102. If there is an unused frequency, the radio node 102 selects the unused frequency as the new frequency to which to switch the particular/adjusted beam (step 502). If there is not an unused frequency, the radio node 102 selects a frequency based on one or more geometric parameters related to the 3D beams, such as the spatial distance and/or spatial angle between the particular/adjusted 3D beam and the 3D beams being operated on each available/candidate frequency. In one embodiment, the available frequencies are ranked based on such criteria and the radio node 102 selects one of the available frequencies based on the ranking (e.g., selects the available frequency having the highest rank).

Thus, in one embodiment, there are two or more 3D beams where a first set of the 3D beams are operated on a first frequency, a second set of the 3D beams are operated on a second frequency, and at least one additional set of the 3D beams are operated on at least one additional frequency. Note that these different sets of 3D beams are mutually exclusive (i.e., each beam is in one and only one set). Additionally, selecting the new frequency for the particular/adjusted beam in step 302/410 to includes selecting the new frequency to which to switch the particular 3D beam from among the available frequencies (excluding the current frequency of the 3D beam) based on one or more geometric parameters related to the particular 3D beam and others of the two or more 3D beams in the second set of beams and the at least one additional set of beams. The set of frequencies can consist of the second frequency and the at least one additional frequency.

Figure 6:
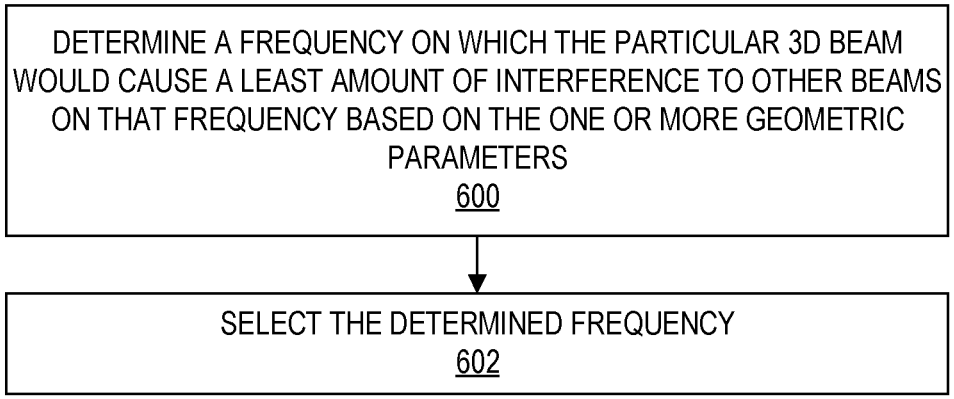
FIG. 6 is a flowchart illustrating a method implemented in a communication system in accordance with one embodiment of the present disclosure.

FIG. 6 is a flowchart illustrating a process by which the radio node 102 selects the new frequency for the particular/adjusted 3D beam in step 302/410/504, in accordance with another embodiment of the present disclosure. As illustrated, in selecting the new frequency to which to switch the particular/adjusted 3D beam, the radio node 102 determines a frequency on which the particular/adjusted 3D beam would cause a least amount of interference to other 3D beams on that frequency based on the one or more geometric parameters (step 600). The radio node 102 selects the determined frequency as the new frequency to which to switch the particular/adjusted 3D beam (step 602).

Figure 7:
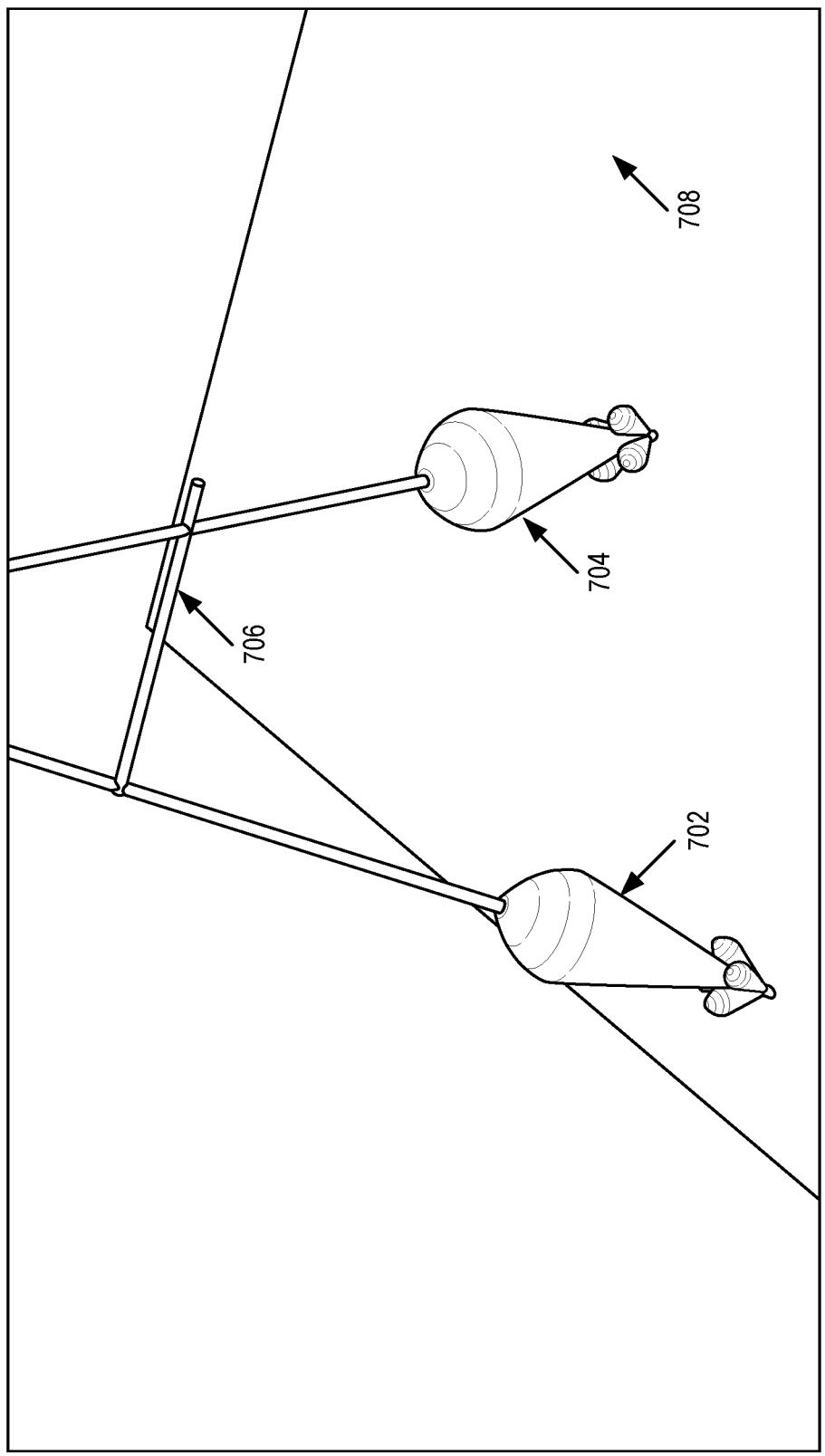
FIG. 7 illustrates one example of the spatial distance between the LOS of two beams.

As discussed above, in some embodiments, the new frequency to which to switch the particular/adjusted 3D beam is selected based on one or more geometric parameters, which may include spatial distance. In this regard, FIG. 7 illustrates one example of the spatial distance between two 3D beams (i.e., two LOS 3D beams). In this example, a direction of a first beam 702 intersects with a direction of a second beam 704 above an antenna array plane 708 (i.e., above the plane formed by the respect 2D planar antenna array). A spatial distance 706 between the first beam 702 and the second beam 704 is indicated by the line that is connecting both the first beam 702 and the second beam 704. The spatial distance 706 is the shortest line that connects two lines (i.e., the LOS of the first beam 702 and the LOS of the second beam 704, in this example) in 3D space and is orthogonal to both. The spatial distance is one criterion that is calculated or determined to understand the interference between two 3D beams. In one example, the first beam 702 is a transmit beam, and the second beam 704 is a receive beam, at the same radio node (e.g. at the radio node 102).

Figure 8:
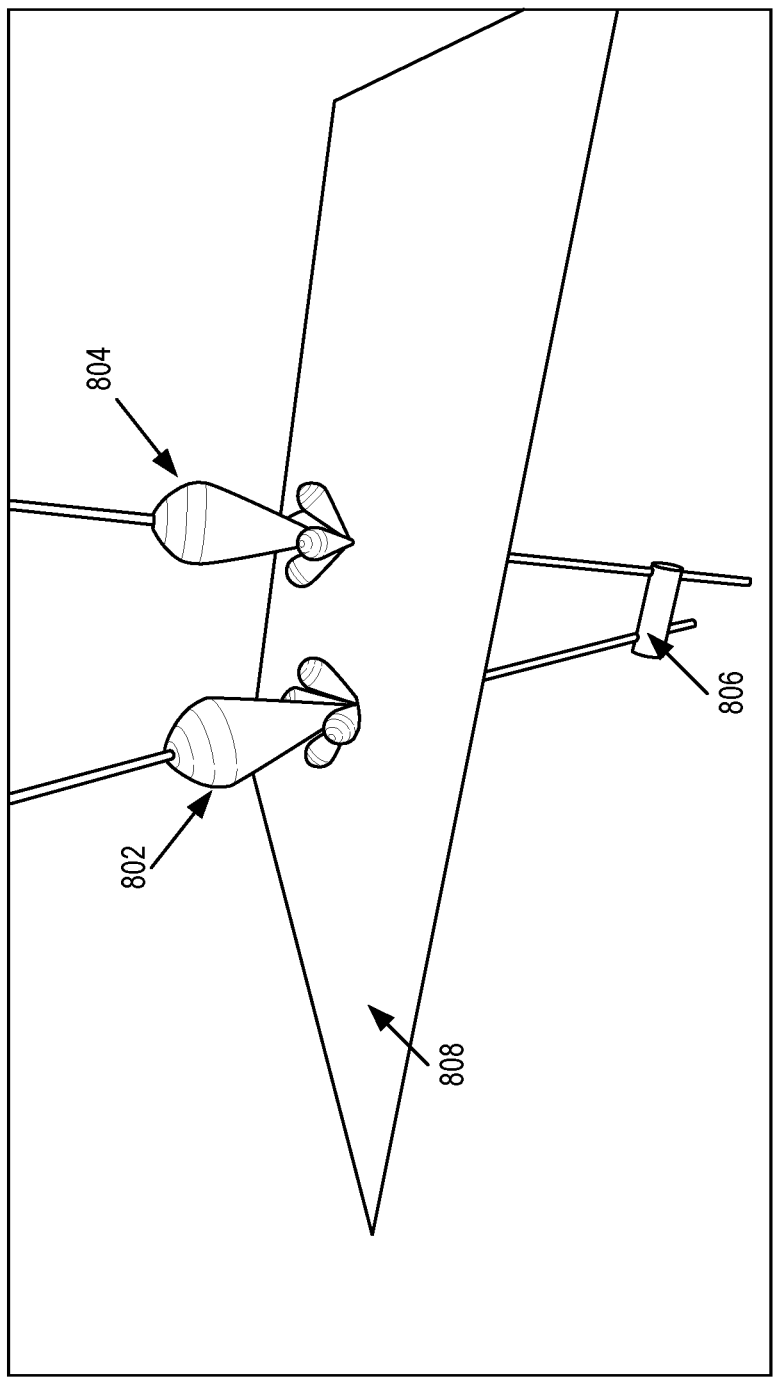
FIG. 8 illustrates one example of the spatial distance between the LOS of two beams

FIG. 8 illustrates another example of the spatial distance between the LOS of two beams. Each of a first beam 802 and a second beam 804 are shown to have a LOS that is directed away from each other. In other words, in contrast to the two beams 702 and 704 whose LOS lines intersect above the antenna plane 708 and therefore interference with one another, the beams 802 and 804 have LOS lines that do not intersect above the antenna plane 808 and as such do not interference with one another. In other words, a spatial distance 806 between the first beam 802 and the second beam 802 falls below the antenna plane as indicated by the line that is connecting both the first beam 802 and the second beam 804. Thus, whether the spatial distance is above or below the antenna plane and the magnitude of the spatial distance are indicators of whether two beams interfere with one another and, if so, how much. In other words, if the spatial distance between the particular/adjusted 3D beam and another 3D beam on a particular frequency is above the antenna plane and has a magnitude that is less than a predefined or preconfigured threshold, then the amount of interference between these two beams would be unacceptable and, as such, the frequency would not be selected as the new frequency for the particular/adjusted 3D beam.

Figure 9B:
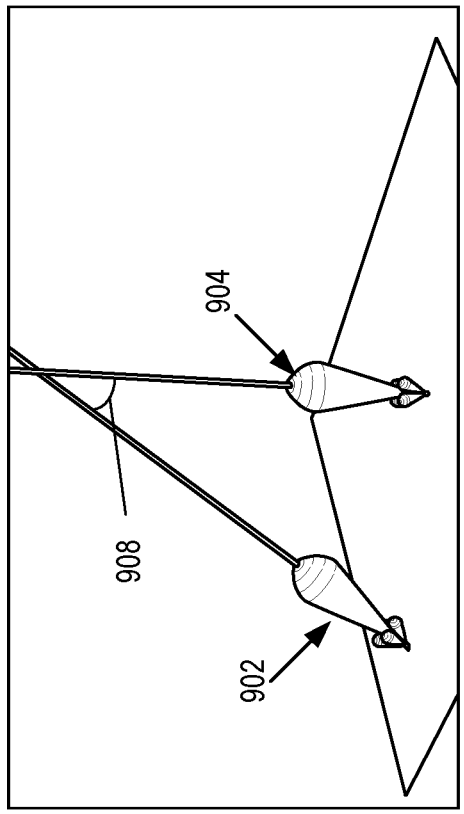
FIG. 9B illustrates one example of the spatial angle between the LOS of two beams.
Figure 9A:
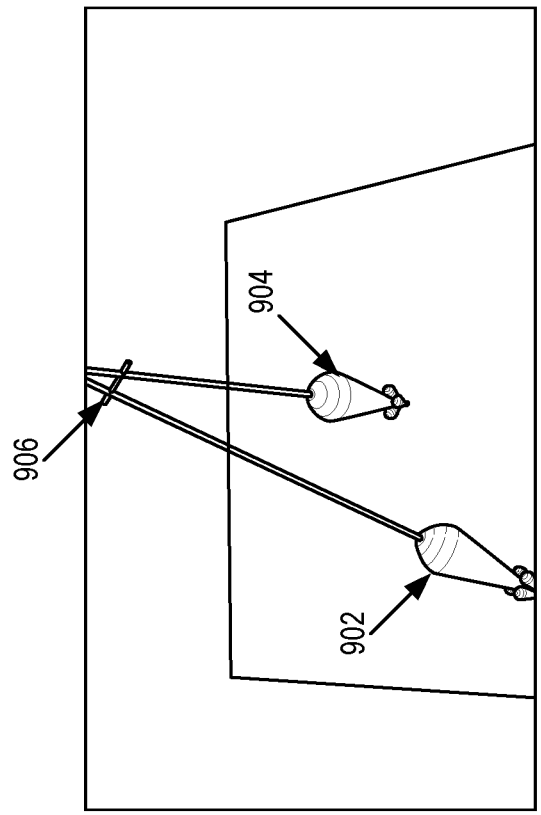
FIG. 9A illustrates one example of the spatial distance between the LOS of two beams.

As discussed above, in some embodiments, the new frequency to which to switch the particular/adjusted 3D beam is selected based on one or more geometric parameters, which may include spatial distance and spatial angle. In this regard, FIGS. 9A and 9B illustrate examples of both spatial distance (FIG. 6A) between the LOS of two beams and the spatial angle (FIG. 6B) between the LOS of two beams. Similarly to FIG. 7, each of a first beam 902 and a second beam 904 are shown to have the LOS that is directed toward each other. A spatial distance 906 is shown. FIG. 9B depicts a similar display of each of the first beam 902 and the second beam 904. In this example, the spatial angle is shown where the two beams intersect. The spatial angle between the two 3D beams is an angle between the two lines representing LOS lines of the two 3D beams 902 and 904. When the beams have a lower spatial angle, there is less inclination of each of the beams being directed towards each other. When the beams have a higher spatial angle, there is a higher inclination of each of the beams being directed toward each other, which creates a higher likelihood for interference between the beams and a lower SINR.

Figure 10A:
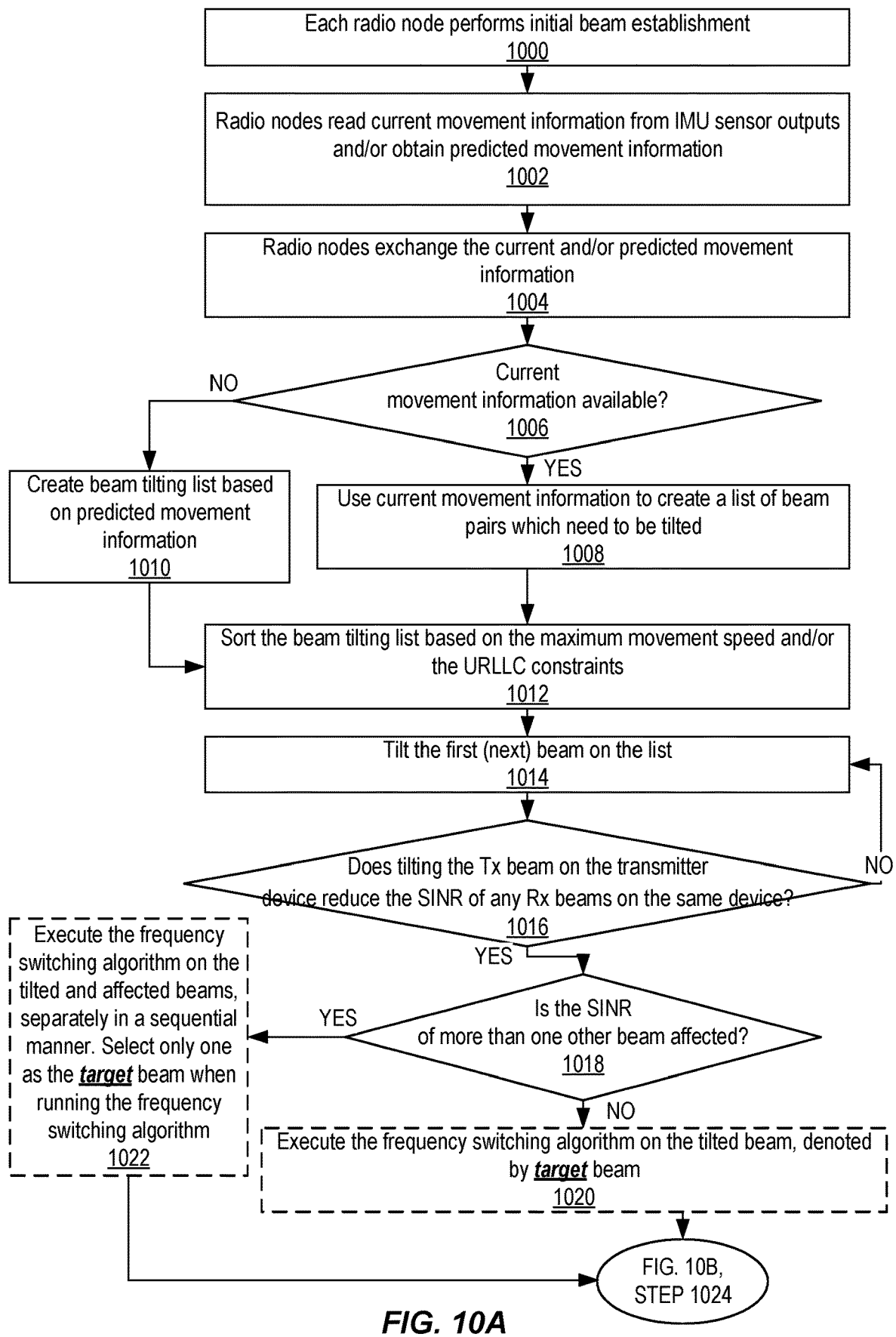
FIG. 10A is a flowchart illustrating a full procedure describing a multi-beam establishment and beam tracking in accordance with one embodiment of the present disclosure.
Figure 10B:
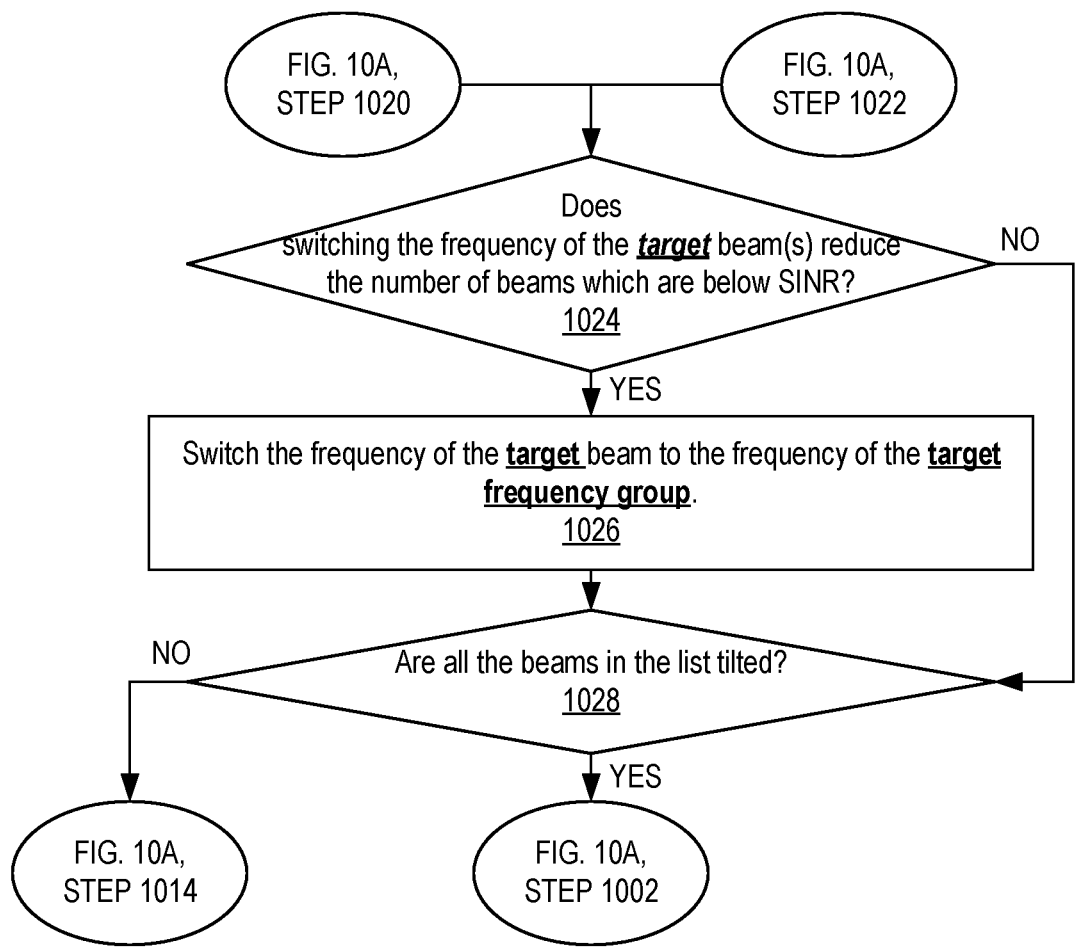
FIG. 10B is a flowchart illustrating a full procedure describing a multi-beam establishment and beam tracking in accordance with one embodiment of the present disclosure.

FIGS. 10A and 10B illustrate a flowchart describing the operation of the wireless system 100 to perform a multi-beam establishment and beam tracking, in accordance with one embodiment. This process is performed by the radio access nodes 102, 104, and 106. Note that while there are three radio nodes used for the description, the process is equally applicable for any number of two or more radio nodes. As illustrated, the radio nodes 102, 104, and 106 perform initial beam establishment, e.g., based on a desired reliability or data rate, thereby creating multiple 3D beams between the radio nodes 102, 104, and 106 that do not interfere with one another (step 1000). The radio nodes 102, 104, and 106 read the outputs of their respective IMU sensors 108, 112, and 116 to obtain current movement information and/or obtain predicted movement information (step 1002). The movement information may be used by the radio nodes 102, 104, and 106 to determine movement direction, speed, acceleration, orientation, and/or the like. The predicted movement information (e.g., predicted trajectory and orientation) for the radio nodes 102, 104, and 106 may be obtained based on historical information or a known schedule of movements of the radio nodes 102, 104, and 106, as described above. The radio nodes 102, 104, and 106 optionally exchange the obtained current and optionally predicted movement information with one another (step 1004).

At each radio node 102/104/106:
- The radio node determines whether the current movement information is available (step 1006).
- If current movement information is available, the radio node uses the current movement information to create a list of beam pairs which need to be adjusted, which is referred to herein as a beam tilting list (step 1008). Optionally, the radio node may also consider predicted movement information, if available, when creating the beam tilting list. Note that the beam tilting list only includes beam pairs for which one of the beams in the pair is a beam of the radio node creating the list.
- If current movement information is not available, the radio node uses the predicted movement information to create the beam tilting list (step 1010). Again, note that the beam tilting list only includes beam pairs for which one of the beams in the pair is a beam of the radio node creating the list.
- Proceeding from step 1008 or 1010, the beam tilting list is sorted based on the maximum movement speed of the two radio nodes which create the each beam pair in the list and/or URLLC constraints. In some embodiments, multiple beam pairs may be sorted based on the maximum movement of the associated pair of radio nodes. For example, if URLLC constraints are considered, then any beams that are used for URLLC are sorted to the top of the beam tilting list.
- The radio node adjusts or tilts the first beam in the beam tilting list based on the current and/or predicted movement of at least one of the respective pair of radio nodes (step 1014).
- The radio nodes determine whether the tilting of the transmit beam reduces the SINR of any of the receive beams on the same device (step 1016).
- If it is determined that the SINR is not reduced for any other beam on the same radio node (step 1016, NO), the process returns to step 1014 and repeats for the next beam in the beam tilting list.
- If it is determined that the SINR of at least one other beam of the same radio node is reduced (i.e., reduced below a predetermined or preconfigured threshold) (step 1016, YES), the radio node determines whether the SINR of more than one other beam of the same radio node is affected (step 1018).
- If no more than one other beam is affected (step 1018, NO), the radio node executes a frequency switching procedure on the tilted beam, which is denoted as the target beam, e.g., with URLLC priority (step 1020). The frequency switching procedure switches the tilted beam to another frequency that is selected such that inter-beam interference is mitigated. An example of the frequency switching procedure is described below with respect to FIG. 11.
- If more than one other beam is affected (step 1018, YES), the radio node executes the frequency switching procedure on the tilted and affected beams, denoted by target beams, separately and sequentially. Accordingly, only one of the affected beams is selected as the target beam when running the frequency switching procedure.
- The radio node determines whether switching the frequency of the target beam(s), of step 1020 and step 1022, reduces the number of beams which are below the SINR threshold (step 1024).
- If it is determined that the switching of the frequency of the target beams does reduce the number of beams which are below the SINR threshold (step 1024, YES), the radio node, switches the frequency of the target beam to the frequency of the target frequency group, with the least number of interfering beams, which is output by the frequency switching procedure, as described below (step 1026).
- If it is determined that the switching of the frequency of the target beams does not reduce the number of beams which are below the SINR threshold (step 1024, NO), the radio node does not switch the frequency of the target beam(s).

The radio node determines whether all of the beams in the beam tilting list have been tilted (step 1028). If so (step 1028, YES), the process returns to step 1002 and is repeated. Otherwise, if it is determined that all of the beams in the list have not been tilted (step 1028, NO), the process returns to step 1014 and is repeated for the next beam in the beam tilting list.

Figure 11:
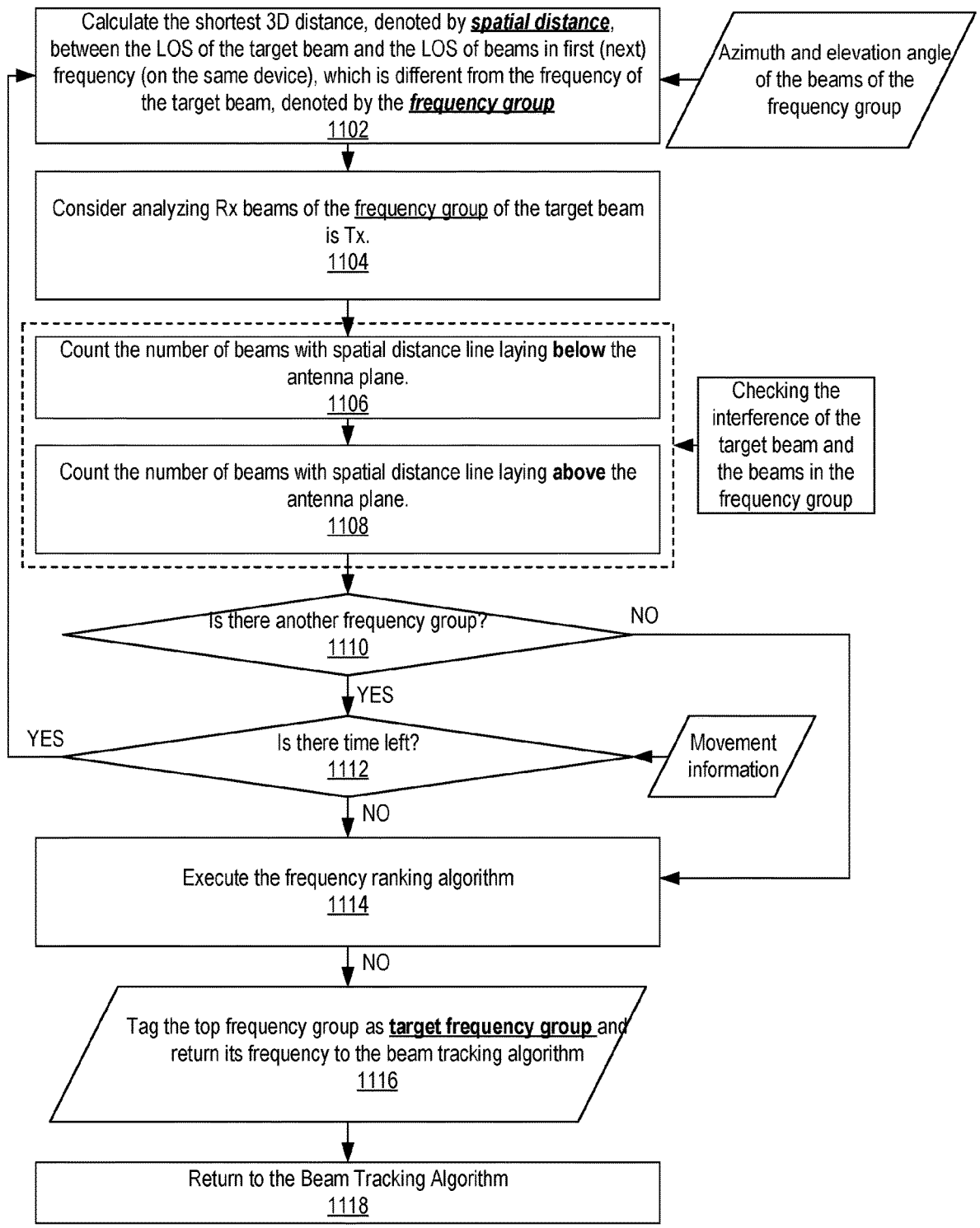
FIG. 11 is a flowchart illustrating the frequency switching procedure to reduce interference caused by beam adjusting in accordance with one embodiment of the present disclosure.

FIG. 11 is a flowchart illustrating the frequency switching procedure of steps 1020 and 1022 in accordance with one embodiment of the present disclosure. As illustrated, the radio node calculates the shortest 3D distance, denoted by spatial distance, between the LOS line of the target beam and the LOS lines of other beams in a first or next frequency (step 1102). The beams on a particular frequency are denoted as a "frequency group." The first or next frequency is a frequency other than the frequency of the target beam. Additionally, in calculating the spatial distance, the azimuth and elevation angle of the beams are considered. The radio node may also consider analyzing the receive (Rx) beams of the frequency group if the target beam is the transmit beam (step 1104). Accordingly, the device comprising the transmit beam performs the tilting of the transmit beam, in order to change the frequency to the next frequency, to reduce interference between the receive beams. In one embodiment, the changing of the frequency to the next frequency can also be communicated to a remote radio node.

The radio node counts the number of beams for which the respective spatial distance line is lying below the antenna plane (step 1106). The radio node counts the number of beams for which the respective spatial distance line is lying above the antenna plane (step 1108). In other words, in steps 1106 and step 1108, the interference caused by the target beam to each of the other beams in the frequency group is determined. Alternatively, if the spatial distance does not meet a predetermine threshold, a spatial angle between the target beam and each of the other beams is determined, to identify the interference between the beams. Accordingly, if the spatial angle is greater than a predetermined threshold, then it is determined that there is a higher chance of interference.

The radio node determines whether there is an additional frequency group that may need to be checked for interference with respect to the target beam (step 1110). If there is another frequency group (step 1110, YES), the radio node determines whether it has remaining time to check another frequency group (step 1112). This check is used to ensure that the frequency switching procedure takes no longer than some predetermined or preconfigured amount of time. If there is additional time (step 1112, YES), the process returns to step 1102 and is repeated to the next frequency group. If it is determined that there is not enough time remaining to process the next frequency group (step 1112, NO) or if there are no further frequency groups to process, a frequency ranking procedure is executed, as described below with respect to FIG. 12 (step 1114). The ranking procedure ranks the frequency groups based on the amount of interference that would be caused by switching the target beam to that frequency, e.g., in this example based on the counts determined in steps 1106 and 1108. The radio nodes tags the top frequency group, as determined by the frequency ranking procedure, as the target frequency group, and the frequency of the target frequency group is returned to the beam tracking procedure (steps 1116 and 1118).

Figure 12:
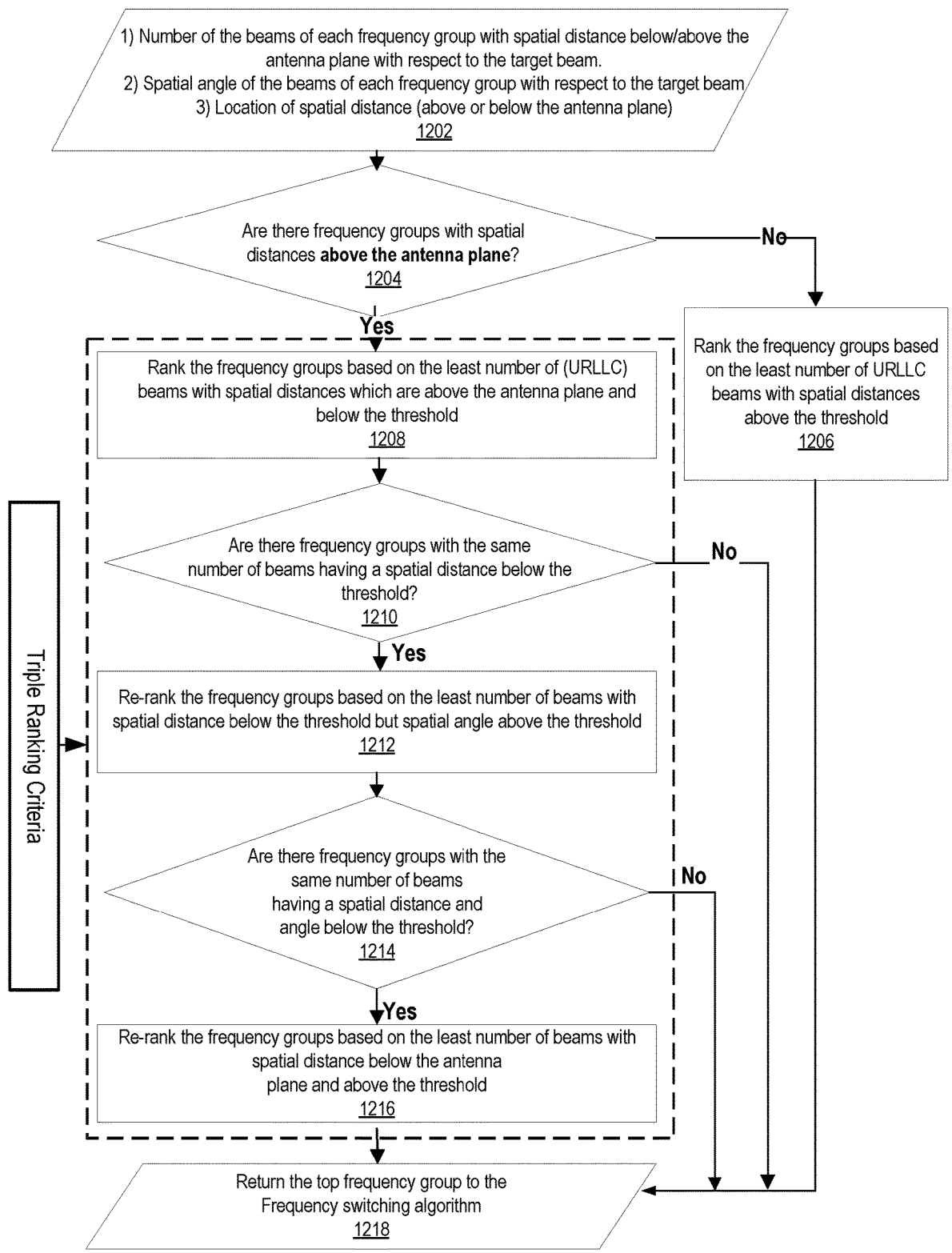
FIG. 12 is a flowchart illustrating a frequency ranking procedure in accordance with one embodiment of the present disclosure.
Figure 13:
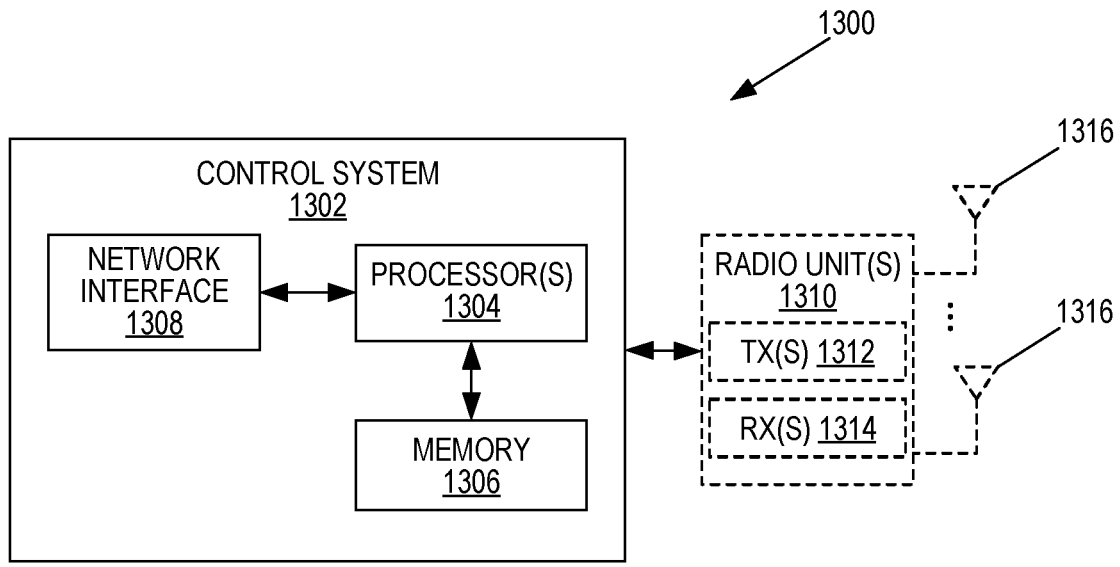
FIG. 13 is a schematic block diagram of a radio access node according to some embodiments of the present disclosure.
Figure 15:
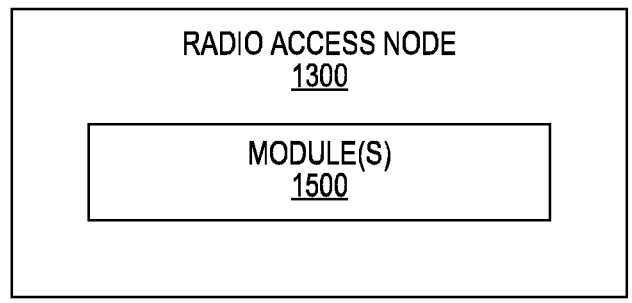
FIG. 15 is a schematic block diagram of the radio access node of FIG. 13 according to some other embodiments of the present disclosure.

FIG. 12 is a flowchart illustrating the frequency ranking procedure of step 1114 in accordance with one embodiment of the present disclosure. In step 1202, values of the number of the beams of each frequency group with spatial distance below/above the antenna plane with respect to the target beam is compiled. The values of the spatial angle of each of the beams of each frequency group with respect to the target beam, is also compiled. Additionally, the location of the spatial distance above or below the antenna plane is also compiled. The radio node determines if there are frequency groups with a spatial distance above the antenna plane (step 1204). If it is determined that there are no frequency groups with a spatial distance above the antenna plane (step 1204, NO), the radio node ranks the frequency groups based on the least number of ultra-reliable low latency communication, URLLC, beams with spatial distances above a threshold. Accordingly, frequency corresponding to the highest ranked frequency group from step 1206 is returned to the frequency switching procedure (step 1218). Alternatively, if it is determined that there are frequency groups with a spatial distance above the antenna plane (step 1204, YES), a triple ranking criteria is invoked (which may be optional). Accordingly, the frequency groups are ranked based on the least number of URLLC beams with spatial distance which are above the antenna plane and below the threshold (step 1208). The radio node determines if there are frequency groups with the same number of beams having a spatial distance below the threshold (step 1210). If it is determined that there aren't any frequency groups with the same number of beams having a spatial distance below the threshold (step 1210, NO), the frequency corresponding to highest ranked frequency group from step 1210 is returned to the frequency switching procedure (step 1218). Alternatively, if it is determined that there are frequency groups with the same number of beams having a spatial distance below the threshold (step 1210, YES), the frequency groups are re-ranked based on the least number of beams with spatial distance below the threshold, and the least number of beams with a spatial angle above the threshold (step 1212). The radio node determines if there are frequency groups with the same number of beams having a spatial distance and a spatial angle below respective thresholds (step 1214). If it is determined that there aren't any frequency groups with the same number of beams having a spatial distance and angle below the threshold (step 1214, NO), the top frequency group from step 1214 is returned to the frequency procedure, in step 1218 If it is determined there are frequency groups with the same number of beams having a spatial distance and angle below the threshold, the frequency groups are re-ranked based on the least number of beams with spatial distances below the antenna plane and above the threshold (step 1216).

Accordingly, in step 1218, the top frequency group from step 1216 is returned to the frequency procedure.

The methods and systems disclosed herein increase the number of 3D beam pairs due to one or more beams being adjusted or tilted after the movement of one or more of the devices, instead of performing beam re-training. As a result, the beam update complexity is reduced significantly.

The methods and systems disclosed herein can be configured to perform spatial geometry for frequency multiplexing among the 3D beams of a 2D planar antenna array, of a device, to reduce the interference among the beam pair connections. Accordingly, the SINR is enhanced for multiple beams with a low complexity approach, and the data rate or reliability is maintained after the beam tilting has reduced the SINR. In addition, the predicted trajectory can be used to reserve resources such as frequency, for instances where the location of a static blockage is known. The predicted trajectory combined with a previously determined schedule can be used to correct error accumulated over time.

Unlike methods that required additional processing, i.e., storing images and processing the images in the event that the wireless link is not disturbed, embodiments of the present disclosure do not require additional processing when the wireless link is not disturbed.

Figure 16:
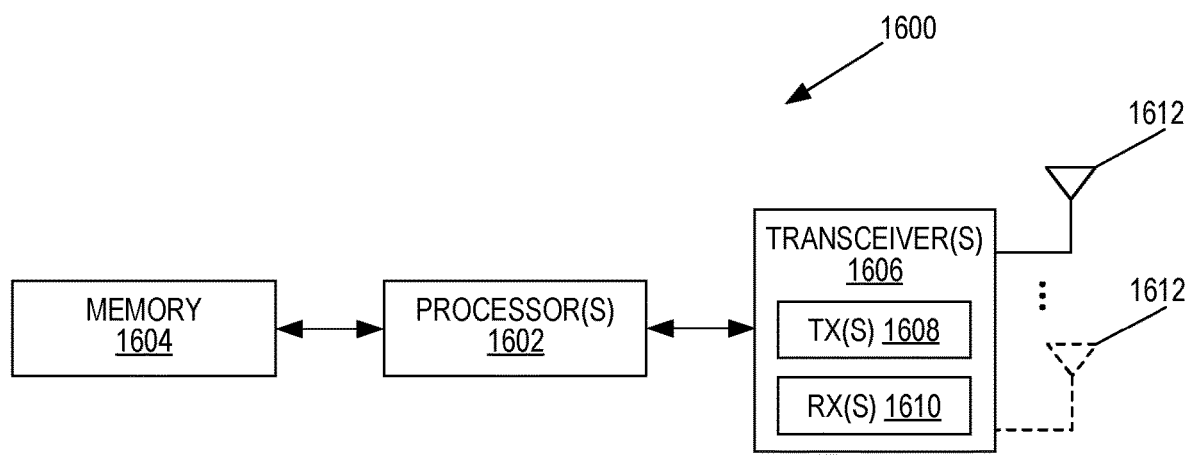
FIG. 16 is a schematic block diagram of a UE device according to some embodiments of the present disclosure.

FIG. 16 is a schematic block diagram of a radio node 1600 according to some embodiments of the present disclosure. The radio node 1600 may be, for example, the radio nodes 102, 104, or 106 described above. As illustrated, the radio node 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612 (e.g., a 2D planar antenna array such as, e.g., the 2D planar antenna array 202, 204, or 206). The transceiver(s) 1606 includes radio-front end circuitry connected to the one or more antennas 1612 that is configured to condition signals communicated between the one or more antennas 1612 and the one or more processors 1602, as will be appreciated by one of ordinary skill in the art. The one or more processors 1602 are also referred to herein as processing circuitry. The one or more transceivers 1606 are also referred to herein as radio circuitry. In some embodiments, the functionality of radio node 1600 described above (e.g., the functionality of the radio nodes 102, 104, or 106 described above) may be fully or partially implemented in software that is, e.g., stored in the memory 1604 and executed by the one or more processors 1602. Note that the radio node 1600 may include additional components not illustrated in FIG. 16 such as, e.g., an IMU sensor (e.g., IMU sensor 108, 112, or 116) one or more user interface components (e.g., an input/output interface including a display, buttons, a touch screen, a microphone, a speaker(s), and/or the like and/or any other components for allowing input of information into the radio node 1600 and/or allowing output of information from the radio node 1600), a power supply (e.g., a battery and associated power circuitry), etc.

In some embodiments, a computer program including instructions which, when executed by at least one processor, causes the at least one processor to carry out the functionality of the radio node 1600 according to any of the embodiments described herein. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
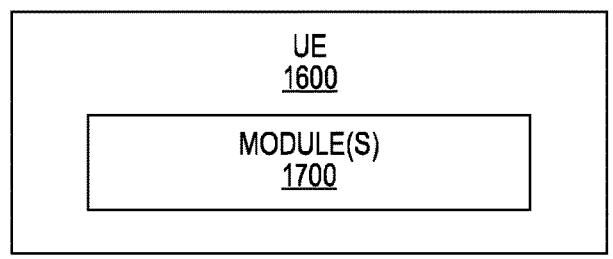
FIG. 17 is a schematic block diagram of the UE of FIG. 16 according to some other embodiments of the present disclosure.

FIG. 17 is a schematic block diagram of the radio node 1600 according to some other embodiments of the present disclosure. The radio node 1600 includes one or more modules 1700, each of which is implemented in software. The one or more modules 1700 provides the functionality of the radio node 1600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2D Two Dimensional
3D Three Dimensional
3GPP Third Generation Partnership Project
5G Fifth Generation
ASIC Application Specific Integrated Circuit
BS Base Station
CPU Central Processing Unit
DSP Digital Signal Processor
D2D Device-to-Device
eNB Enhanced or Evolved Node B
FPGA Field Programmable Gate Array
GHz Gigahertz
gNB New Radio Base Station
gNB-CU New Radio Base Station Central Unit
gNB-DU New Radio Base Station Distributed Unit
IMU Inertial Measurement Unit
IoT Internet of Things
IP Internet Protocol
LOS Line of Sight
LTE Long Term Evolution
MIMO Multiple Input Multiple Output
MME Mobility Management Entity
mmWave Millimeter Wave
MTC Machine Type Communication
NR New Radio
NRF Network Function Repository Function
PC Personal Computer
P-GW Packet Data Network Gateway
RAM Random Access Memory
RAN Radio Access Network
RF Radio Frequency
SCEF Service Capability Exposure Function
SINR Signal to Interference Plus Noise Ratio
UE User Equipment
URLLC Ultra-Reliable Low-Latency Communication Those skilled in the art will recognize improvements and modifications to the embodiments of the present disclosure. All such improvements and modifications are considered within the scope of the concepts disclosed herein.

The invention claimed is:

1. A method performed by a first radio node for mitigating interference between two or more three-dimensional, 3D, beams between the first radio node and one or more other radio nodes, the method comprising:
performing an initial beam establishment procedure to determine a plurality of beam pairs between the first radio node and one or more other radio nodes, the plurality of beam pairs comprising:
  a first beam pair between the first radio node and a second radio node, the first beam pair comprising a first transmit beam for signal transmission from the first radio node to the second radio node and a first receive beam for signal reception at the first radio node from the second radio node; and
  a second beam pair between the first radio node and another radio node where the another radio node is either the second radio node or a third radio node, the second beam pair comprising a second transmit beam for signal transmission from the first radio node to the another radio node and a second receive beam for signal reception at the first radio node from the another radio node;
obtaining movement information for the first radio node, the second radio node, and the another radio node;
determining, from among the plurality of beam pairs, two or more beam pairs to be adjusted based on the movement information;
selecting, based one or more parameters, a beam pair from among the two or more beam pairs to be adjusted;
adjusting a transmit beam of the selected beam pair;
determining one or more other beams from among the plurality of beam pairs affected by the adjusted transmit beam, the adjusted transmit beam and the one or more other beams being on a same frequency;
performing a frequency switching procedure such that either the adjusted transmit beam or at least one of the one or more other beams affected by the adjusted transmit beam is switched to a different frequency; and
repeating the steps of selecting a transmit beam from among the two or more beam pairs to be adjusted, adjusting the selected transmit beam, determining one or more other beams, and performing the frequency switching procedure, for at least one additional transmit beam from among the two or more transmit beams to be adjusted.

2. The method of claim 1, wherein the one or more parameters comprise movement speed of respective ones of the plurality of other radio nodes.

3. The method of claim 1, wherein the one or more parameters comprise ultra-reliable low-latency communication constraints associated to the respective beam pairs.

4. The method of claim 1, wherein performing the frequency switching procedure comprises selecting the different frequency to which to switch the adjusted transmit beam or the at least one of the one or more other beams affected by the adjusted transmit beam from a plurality of frequencies.

5. The method of claim 4, wherein the selected different frequency is one of the plurality of frequencies that is unused.

6. The method of claim 4, wherein the selected different frequency is one of the plurality of frequencies to which the adjusted transmit beam or the at least one of the at least one of the one or more other beams affected by the adjusted transmit beam will cause a least amount of interference to other beams on the selected different frequency.

7. A first radio node for mitigating interference between two or more three-dimensional, 3D, beams between the first radio node and one or more other radio nodes, the first radio node comprising processing circuitry configured to cause the first radio node to:
  perform an initial beam establishment procedure to determine a plurality of beam pairs between the first radio node and one or more other radio nodes, the plurality of beam pairs comprising:
    a first beam pair between the first radio node and a second radio node, the first beam pair comprising a first transmit beam for signal transmission from the first radio node to the second radio node and a first receive beam for signal reception at the first radio node from the second radio node; and
    a second beam pair between the first radio node and another radio node where the another radio node is either the second radio node or a third radio node, the second beam pair comprising a second transmit beam for signal transmission from the first radio node to the another node and a second receive beam for signal reception at the first radio node from the another radio node
  obtain movement information for the first radio node, the second radio node, and the another radio node;
  determine, from among the plurality of beam pairs, two or more beam pairs to be adjusted based on the movement information;
  select, based one or more parameters, a beam pair from among the two or more beam pairs to be adjusted;
  adjust a transmit beam of the selected beam pair;
  determine one or more other beams from among the plurality of beam pairs affected by the adjusted transmit beam, the adjusted transmit beam and the one or more other beams being on a same frequency;
  perform a frequency switching procedure such that either the adjusted transmit beam or at least one of the one or more other beams affected by the adjusted transmit beam is switched to a different frequency; and
  repeat the steps of selecting a transmit beam from among the two or more beam pairs to be adjusted, adjusting the selected transmit beam, determining one or more other beams, and performing the frequency switching procedure, for at least one additional transmit beam from among the two or more transmit beams to be adjusted.

8. The first radio node of claim 7, wherein the one or more parameters comprise movement speed of the respective ones of the plurality of other radio nodes.

9. The first radio node of claim 7, wherein the one or more parameters comprise associated ultra-reliable low-latency communication constraints associated to the respective beam pairs.

10. The first radio node of claim 7, wherein in order to perform the frequency switching procedure, the processing circuitry is further configured to cause the first radio node to select the different frequency to which to switch the adjusted transmit beam or the at least one of the one or more other beams affected by the adjusted transmit beam from a plurality of frequencies.

11. The first radio node of claim 10, wherein the selected different frequency is one of the plurality of frequencies that is unused.

12. The first radio node of claim 10, wherein the selected different frequency is one of the plurality of frequencies to which the adjusted transmit beam or the at least one of the at least one of the one or more other beams affected by the adjusted transmit beam will cause a least amount of interference to other beams on the selected different frequency.

* * * * *